United States Patent
Bae et al.

(10) Patent No.: US 9,959,589 B2
(45) Date of Patent: May 1, 2018

(54) IMAGE DRIVING DEVICE, ELECTRONIC DEVICE INCLUDING IMAGE DRIVING DEVICE, AND IMAGE DRIVING METHOD

(71) Applicant: SAMSUNG ELECTRONICS CO., LTD., Suwon-si, Gyeonggi-do (KR)

(72) Inventors: Jong-kon Bae, Seoul (KR); Won-sik Kang, Seoul (KR); Yang-hyo Kim, Suwon-si (KR); Jae-hyuck Woo, Osan-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 146 days.

(21) Appl. No.: 14/465,139

(22) Filed: Aug. 21, 2014

(65) Prior Publication Data
US 2015/0103081 A1    Apr. 16, 2015

(30) Foreign Application Priority Data

Oct. 11, 2013 (KR) .................. 10-2013-0121498

(51) Int. Cl.
| | |
|---|---|
| *G06T 1/60* | (2006.01) |
| *G06T 1/20* | (2006.01) |
| *G09G 5/18* | (2006.01) |
| *G09G 5/00* | (2006.01) |

(52) U.S. Cl.
CPC .................. *G06T 1/20* (2013.01); *G06T 1/60* (2013.01); *G09G 5/003* (2013.01); *G09G 5/18* (2013.01); *G09G 5/005* (2013.01); *G09G 5/006* (2013.01); *G09G 2320/103* (2013.01); *G09G 2330/021* (2013.01); *G09G 2360/18* (2013.01)

(58) Field of Classification Search
None
See application file for complete search history.

(56) References Cited

U.S. PATENT DOCUMENTS

| | | | |
|---|---|---|---|
| 7,705,814 B2 | 4/2010 | Baik et al. | |
| 7,742,065 B2 | 6/2010 | Furihata et al. | |
| 7,898,513 B2 | 3/2011 | Kong | |
| 9,165,537 B2* | 10/2015 | Wyatt | ..................... G09G 5/395 |
| 2012/0133659 A1* | 5/2012 | Masnikosa | ............. G06T 15/005 |
| | | | 345/520 |
| 2012/0147020 A1* | 6/2012 | Hussain | .................... G06T 1/00 |
| | | | 345/522 |
| 2013/0003850 A1 | 1/2013 | Sugio et al. | |

(Continued)

FOREIGN PATENT DOCUMENTS

| | | |
|---|---|---|
| KR | 10-1995-0028516 | 10/1995 |
| KR | 10-2003-0059996 A | 7/2003 |

(Continued)

*Primary Examiner* — Jacinta M Crawford
(74) *Attorney, Agent, or Firm* — Lee & Morse, P.C.

(57) ABSTRACT

An image driving device includes a determining unit, and image processing unit, and a memory. The determining unit determines whether an input image is a moving image or a still image, and may be synchronized with an internal clock different from an external clock. The image processing unit may image-process at least one frame but less than all frames of the input image when the input image is determined to be a still image. The image processing unit may output the at least one image-processed frame as first image data, and the memory may store the first image data.

20 Claims, 30 Drawing Sheets

(56) References Cited

U.S. PATENT DOCUMENTS

| | | | | |
|---|---|---|---|---|
| 2013/0235014 A1* | 9/2013 | Lee | ............................ | G06F 1/32 |
| | | | | 345/211 |
| 2013/0235055 A1* | 9/2013 | Kim | ........................ | G09G 5/006 |
| | | | | 345/545 |
| 2013/0235941 A1* | 9/2013 | Koo | ........................ | G09G 5/006 |
| | | | | 375/240.26 |

FOREIGN PATENT DOCUMENTS

| KR | 10-2004-0062102 A | 7/2004 |
|---|---|---|
| KR | 10-2005-0063567 A | 6/2005 |
| KR | 10-2005-0099304 A | 10/2005 |
| KR | 10-2006-0024142 A | 3/2006 |
| KR | 10-2007-0049022 A | 5/2007 |
| KR | 10-2010-0073457 A | 7/2010 |
| KR | 10-2010-0036052 A | 4/2012 |
| TW | 201311006 A | 3/2013 |

\* cited by examiner

IMAGE DRIVING DEVICE, ELECTRONIC DEVICE INCLUDING IMAGE DRIVING DEVICE, AND IMAGE DRIVING METHOD

CROSS-REFERENCE TO RELATED APPLICATION

Korean Patent Application No. 10-2013-0121498, filed on Oct. 11, 2013, and entitled, "Image Driving Device, Electronic Device Including Image Driving Device, And Image Driving Method," is incorporated by reference herein in its entirety.

BACKGROUND

1. Field

One or more embodiments described herein relate to image processing.

2. Description of the Related Art

Attempts have been made to reduce the drive time and power consumption of image processing methods. These attempts have proven to be ineffective, and may even adversely affect the operation of host electronic devices.

SUMMARY

In accordance with one embodiment, an image driving device includes a determining unit to determine whether an input image is a moving image or a still image, the determining unit to be synchronized with an internal clock different from an external clock; an image processing unit to image-process at least one frame but less than all frames of the input image when the input image is determined to be a still image, and to output the at least one image-processed frame as first image data; and a memory to store the first image data.

The determining unit may include a first comparison unit to compare representative values of consecutive frames of the input image and to output a first comparative value based on the comparison performed by the first comparison unit; and a second comparison unit to compare whether the consecutive frames of the input image are equal when the first comparative value indicates that the representative values of the consecutive frames are equal, and to output a second comparative value based on the comparison performed by the second comparison unit.

Each of the representative values of the consecutive frames may indicate at least one of a check sum, a data sum, a data histogram, or random address data of a corresponding one of the consecutive frames, or each of a plurality of lines of the consecutive frames. The device may include a first storage area to store a representative value of a previously input frame from among the consecutive frames of the input image.

When the consecutive frames of the input image are determined to be equal, the second comparison unit may withhold comparing whether the consecutive frames of the input image are equal during a first period corresponding to a frame rate of the input image.

The determining unit may output a determination result indicating that the input image is a moving image when the first comparative value indicates that the representative values of the consecutive frames of the input image are not equal, and the determining unit may output a determination result indicating that the input image is a still image when the second comparative value indicates that the consecutive frames of the input image are equal.

The second comparison unit may compare the first image data stored in the memory and a frame that is currently determined by the determining unit, and is to generate the second comparative value based on the comparison. The memory may be reset when a determination result changes from indicating that the input image is a still image to indicating that the input image is a moving image. The second storage may store a determination result of a previously input frame from among the consecutive frames of the input image.

The image processing unit may image-process only a first frame of the input image and is to transmit the image-processed first frame to the memory, when the determining unit determines that the input image is a still image.

The image processing unit may image-process at least one arbitrary frame of the input image only and is to transmit the at least one image-processed arbitrary frame to the memory, when the determining unit determines that the input image is a still image.

The image processing unit may generate second image data by image-processing all frames of the input image and is to output the second image data to an external display device instead of the memory, when the determining unit determines that the input image is a moving image.

The determining unit may not determine whether the input image is a moving image or a still image during a second period corresponding to a least frame unit set with respect to the moving image, when the determining unit determines that the input image is a moving image.

The device may include an output unit to output one of the first image data stored in the memory or second image data based on a result of the determination by the determining unit, wherein the second image data is data not stored in the memory but directly output from the image processing unit as output data of the input image.

The memory may perform a refresh operation corresponding to a frame rate of output data of the image driving device and is to repeatedly output the first image data, when the determining unit determines that the input image is a still image.

The memory may have a size less than each frame of the input image, and the image driving device may include an encoder to compress the first image data; and a decoder to decode the first image data compressed and stored in the memory as output data of the input image. The external clock and input data may be input based on control of an application processor of a mobile terminal in which the image driving device is included.

In accordance with another embodiment, an image driving device includes a determining unit to determine whether an input image is a moving image or a still image; a control unit to output a first control signal based on a determination result from the determining unit; an image processing unit to output first image data by image-processing at least one frame but less than all frames of the input image, or to output second image data by image-processing all frames of the input image, based on the first control signal; a memory to store the first image data in response to the first control signal; and an output unit to output one of the first image data stored in the memory or the second image data not stored in the memory as output data of the input image, in response to the first control signal.

The determining unit may include a first comparison unit to compare a first representative value of a current frame of the input image with a second representative value of a previous frame of the input image stored in a first storage area, the first comparison unit to output a first comparative value based on the comparison to be performed by the first comparison unit, and a second comparison unit to compare whether the current frame of the input image is equal to the previous frame of the input image when the first comparative value indicates that the first representative value is equal to the second representative value, the second comparison unit to output a second comparative value based on the comparison to be performed by the second comparison unit. The control unit may output the first control signal by synchronizing the first control signal with an internal clock different from an external input clock.

In accordance with another embodiment, an image driving device includes a determining unit to determine whether an input image is a moving image or a still image; an image processing unit to image-process a different number of frames based on whether the input image is a moving image or still image; and a memory to store the image-processed frames based on whether the input image is a moving image or still image, wherein power consumption to output the input image as output data differs based on whether the input image is a moving image or still image.

In accordance with another embodiment, an electronic device includes a communication processor to control a transmitter and a receiver; an application processor to control operations of one or more functional blocks in the electronic device; and a system-on-chip to which a display driver integrated chip (IC) is connected via an interconnector, the system-on-chip to process an input image input according control of the application processor to produce output data; and a display device to display output data.

The display driver IC is one of the functional blocks and wherein the display driver IC includes: determining unit to determine whether an input image is a moving image or a still image, the determining unit to be synchronized with an internal clock different from an operation clock of the application processor; an image processing unit to image-process a different number of frames based on whether the input image is a moving image or still image; a memory to store the image-processed frames based on whether the input image is a moving image or still image; and an output unit to output one of data stored in the memory or data not stored in the memory as the output data.

The determining unit may include a first comparison unit to compare a first representative value of a current frame of the input image with a second representative value of a previous frame of the input image stored in a first storage area, and to output a result of the comparison indicating that the input image is a moving image when the first representative value is different from the second representative value; and a second comparison unit to compare the current frame of the input image with the previous frame when the first and second representative values are equal, and to output a result of the comparison indicating that the input image is a still image when the current frame and the previous frame are equal. The display driver IC may output the input image as the output data in full high definition (HD) or in ultra definition (UD).

In accordance with another embodiment, a method for driving an image driving device includes determining whether an input image is a moving image or a still image by comparing consecutive frames of the input image; image-processing a different number of frames based on whether the input image is a moving image or still image based on a result of the comparison; and storing the image-processed frames in a memory based on whether the input image is a moving image or still image.

In accordance with another embodiment, an apparatus includes an analyzer to determine whether input image data corresponds to a moving image or a still image; and an image processor to process a first number of frames of the input image data when the input image data corresponds to a still image and to process a second number of frames when the input image data corresponds to a moving image, wherein the first number of frames is different from the second number of frames. The first number of frames may be fewer than all frames of the input image data. The image processor outputs the processed second number of frames without storing the second number of frames in a graphic memory.

The analyzer may include a first comparator to compare representative values of consecutive frames of the input image data and to output a first value based on the comparison; and a second comparator to compare whether the consecutive frames of the input image data are equal when the first value indicates that the representative values of the consecutive frames are equal, the second comparator to output a second value based on the comparison performed by the second comparator.

Each of the representative values of the consecutive frames may indicate at least one of a check sum, data sum, data histogram, or random address data of a corresponding one of the consecutive frames. When the consecutive frames of the input image data are equal, the second comparator may withhold comparing whether the consecutive frames of the input image are equal during a first period based on frame rate of the input image data.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
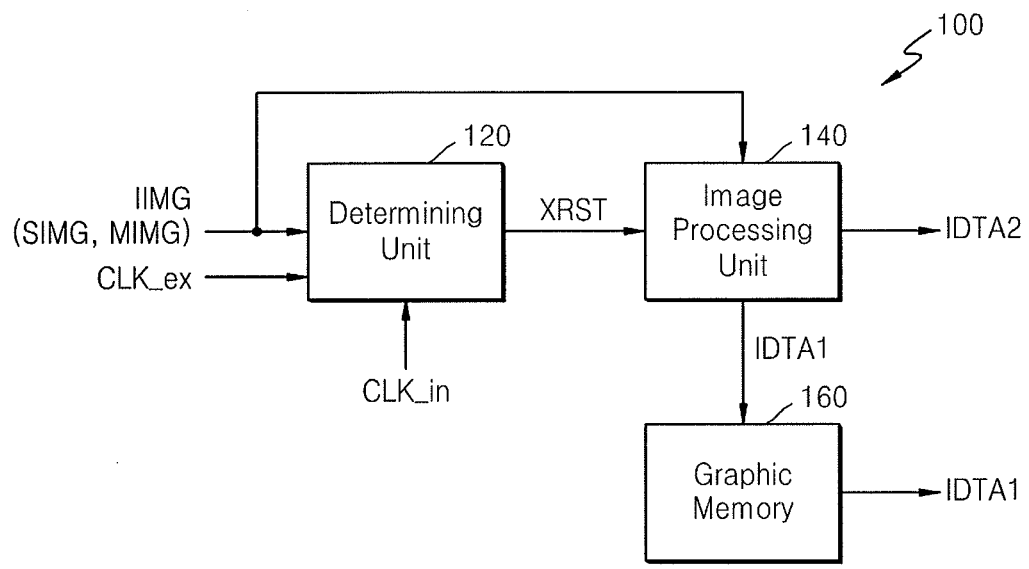
FIG. 1 illustrates an embodiment of an image driving device.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates an embodiment of an image driving device 100 which includes a determining unit 120, an image processing unit 140, and a graphic memory 160. The determining unit 120 determines whether an input image IIMG is a still image SIMG or a moving image MIMG, and outputs a determination result XRST. Accordingly, the determining unit 120 may be considered as an analyzer.

The determining unit 120 may determine whether an image is a still or moving image in various ways. In one embodiment, the determining unit 120 makes this determination by being synchronized with an internal clock CLK_in separate from an external clock CLK_ex. For example, the external clock CLK_ex may be an operation clock of a host apparatus or system including or coupled to image driving device 100.

In one implementation, the external clock CLK_ex may be an operation clock of an application processor of an apparatus including the image driving device 100. The internal clock CLK_in may be an operation clock of the image driving device 100. For example, the internal clock CLK_in may be a clock adapted to a display operation of a display device for displaying an output of the image driving device 100. The internal clock CLK_in may be, for example, a clock having the same period as a vertical synchronization signal Vsync (which provides an indication of a vertical location) or a horizontal synchronization signal Hsync (which provides an indication of a horizontal location) of a frame (display data) to be displayed on the display device. The internal clock CLK_in may not be synchronized with the external clock CLK_ex, but this is not a necessity.

The determination result XRST is transmitted to the image processing unit 140. In response to the determination result XRST, the image processing unit 140 performs different image processes on the still image SIMG and the moving image MIMG.

Figure 2:
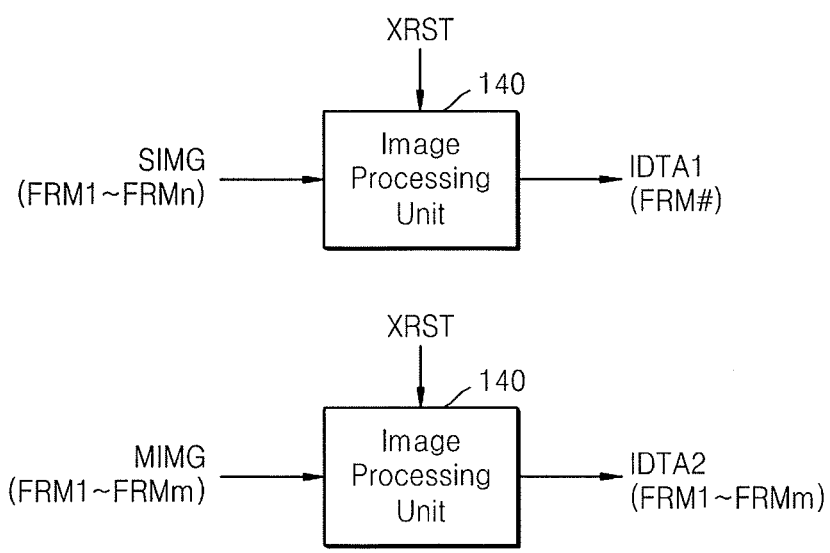
FIGS. 2 and 3 illustrate operations of an image processing unit embodiment.
Figure 3:
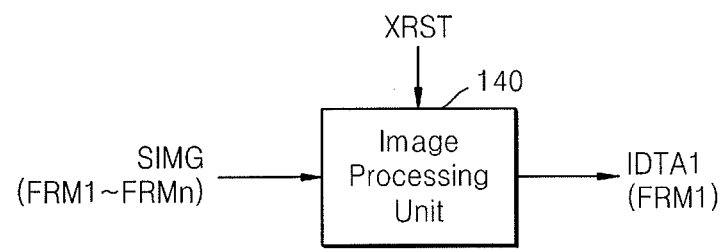

FIGS. 2 and 3 illustrate examples of operations which may be performed by image processing unit 140. Referring to FIG. 2, image processing unit 140 may image-process only some frames FRM# from among first through nth frames FRM1 through FRMn for a still image SIMG. The image processing unit 140 may image-process a greater number of frames than frames FRM# for a moving image MIMG. For example, image processing unit 140 may image-process all of first through mth frames FRM1 through FRMm for a moving image MIMG. Referring to FIG. 3, image processing unit 140 may image-process, for example, only first frame FRM1 for a still image SIMG.

Alternatively, image processing unit 140 may image-process a frame different from first frame FRM1 of still image SIMG based on an operation scheme or operation timing of the image driving device 100. For example, image processing unit 140 may image-process a second frame or a subsequent frame of the still image SIMG, if a time required for determining unit 120 to determine whether the input image IIMG is a still or moving image is greater than a time required for the image processing unit 140 to image-process each frame. At any rate, image processing unit 140 may image-process at least one frame of still image SIMG.

For illustrative purposes only, in the following description, image processing unit 140 image-processes a first frame for still image SIMG and image-processes all frames for moving image MIMG. When image processing unit 140 image-processes an arbitrary frame of a plurality of frames for still image SIMG, other frames of the still image SIMG may only be received by an input buffer of the image processing unit 140.

Referring again to FIG. 1, image processing unit 140 image-processes the some frames FRM# of the first through nth frames FRM1 through FRMn for still image SIMG, and image-processes all of first through mth frames FRM1 through FRMm for moving image MIMG. For example, image processing unit 140 may compensate for deterioration of an image caused by a sun light effect, a flash effect, a film mode, panning, or a scene change. For example, visibility of letters in an image may be low due to a sun light effect. Image processing unit 140 may process the image to compensate for the low visibility of letters. After processing the image, image processing unit 140 outputs the still image SIMG as first image data IDTA1 and the moving image MIMG as second image data IDTA2.

Image driving device 100 may include or be coupled to graphic memory 160. The amount and quality of images to be processed by image driving device 100 may rapidly increase for some display environments or conditions. This will increase the amount of input or output data of the image driving device 100. As a result, image driving device 100 may have high-speed driving capability. Also, the image driving device 100 may have low power consumption, making it suitable for use in a variety of portable electronic devices. The graphic memory 160 may aid in allowing the image driving device 100 to achieve this level of performance.

The graphic memory 160 stores or does not store data that is image-processed by image processing unit 140 based on whether the input image IIMIG is a still image SIMG or moving image MIMG. The graphic memory 160 may only store the first image data IDTA1 corresponding to still image SIMG.

Figure 4:
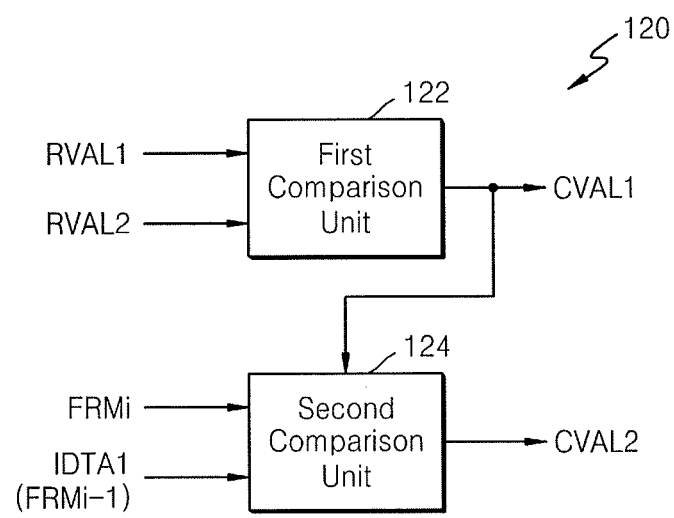
FIG. 4 illustrates an embodiment of a determining unit.

FIG. 4 illustrates an embodiment of determining unit 120. Referring to FIGS. 1 and 4, determining unit 120 includes a first comparison unit 122 and a second comparison unit 124. The first comparison unit 122 outputs a first comparative value CVAL1 based on a comparison of representative values of consecutive frames of the input image IIMG.

For example, consider the case of when two consecutive frames of input image IIMG are received. A first frame of the consecutive frames may be referred to as an i−1th frame FRMi−1, and a next frame may be referred to as an ith frame FRMi. Representative values of the i−1th frame FRMi−1 and ith frame FRMi may be referred to as a first represent value RVAL1 and second represent value RVAL2, respectively.

Also, a frame of input image IIMG currently determined to be a still image SIMG or moving image MIMG may be referred to as ith frame FRMi. A frame that was a target of the determination result XRST in the internal clock CLK_in immediately before the ith frame FRMi may be referred to as the i−1th frame FRMi−1.

Figure 5A:
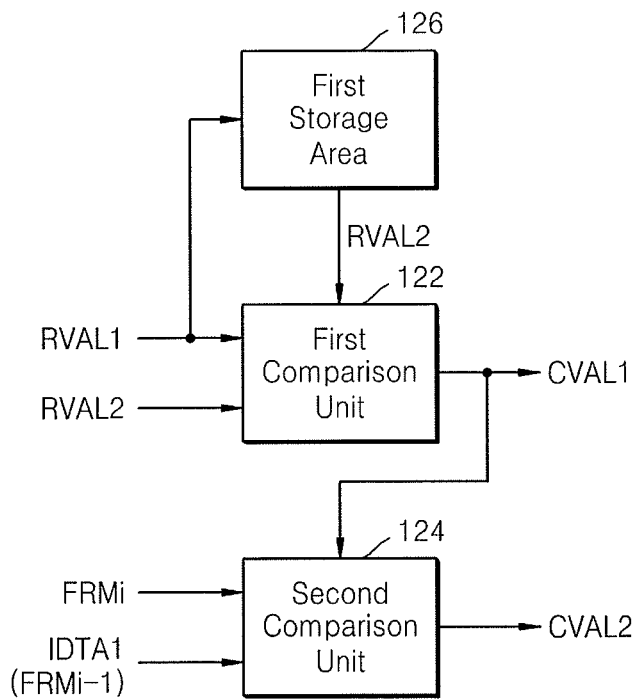
FIG. 5A illustrates an example of a space in which a second comparative value may be stored.

FIG. 5A illustrates an example of a space in which a second comparative value of FIG. 4 may be stored. Referring to FIG. 5A, the second representative value RVAL2 of the i−1th frame FRMi−1 processed in the internal clock CLK_in immediately before the ith frame FRMi may be stored in a first storage area 126. The first storage area 126 may be included in a storage unit for storing information or data having a relatively small size. Examples include a register or latch. The first storage area 126 may output second representative value RVAL2 of the i−1th frame FRMi−1, and may be updated to store the first representative value RVAL1 of the ith frame FRMi.

Alternatively, the first storage area 126 may have a size sufficient to store both the first representative value RVAL1 and the second represent value RVAL2. In this case, the first storage area 126 may output the second represent value RVLA2 while storing the first representative value RVAL1. The first storage area 126 may be included in or coupled to determining unit 120. In FIGS. 4 and 5A, the first representative value RVAL1 is illustrated as being input from outside the first comparison unit 122, but this is not necessary.

Figure 5B:
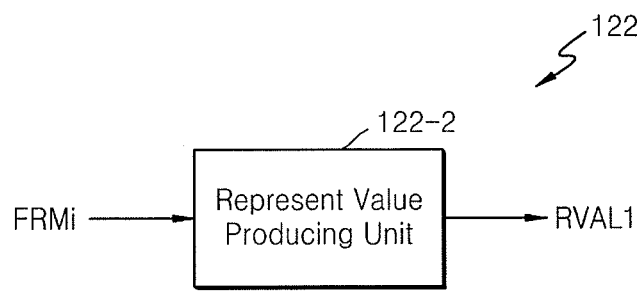
FIG. 5B illustrates an embodiment a first comparison unit.

As shown in FIG. 5B, the first comparison unit 122 may include a representative value producing unit 122-2, which produces the first representative value RVAL1 from the ith frame FRMi. For example, the representative value producing unit 122_2 may produce at least one of a check sum, a data sum, a data histogram, or random address data for the ith frame FRMi, and may process at least one of them as the first representative value RVAL1.

Referring back to FIGS. 1 and 4, the first comparison unit 122 may generate the first comparative value CVAL1 based on a comparison of the first representative value RVAL1 and the second representative value RVAL2. For example, when the first and second representative values RVAL1 and RVAL2 are the same, the first comparison unit 122 may generate the first comparative value CVAL1 to have a first logical value (e.g., a high logical value H). When the first and second representative values RVAL1 and RVAL2 are different, the first comparison unit 122 may generate the first comparative value CVAL1 to have a second logical value (e.g., a low logical value L).

The first and second representative values RVAL1 and RVAL2 may indicate at least one of a check sum, a data sum, a data histogram, or random address data of the ith frame FRMi and the i−1th frame FRMi−1, respectively.

Figure 6:
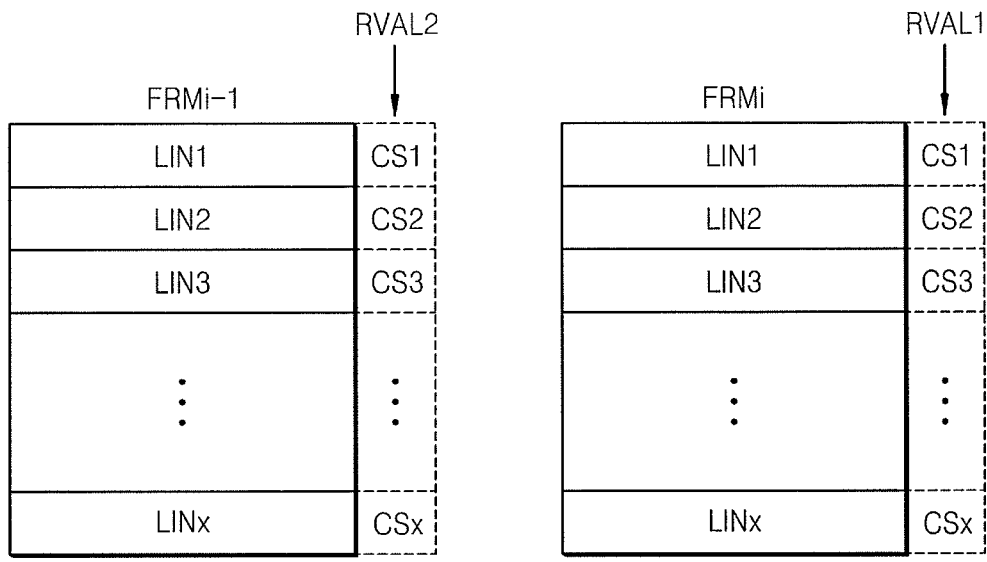
FIGS. 6-9 illustrate examples of values of a frame for one embodiment.

FIGS. 6 through 9 illustrate examples of representative values of each frame according to different embodiments. Referring to FIG. 6, first and second representative values RVAL1 and RVAL2 may be check sums CS1 through CSx for respective ones of the ith frame FRMi and i−1th frame FRMi−1. The check sums CS1 through CSx may be used to check an error of data. These check sums may be obtained, for example, by adding values (e.g., signal values or data values) before each of lines LIN1 through LINx of the input image IIMG, in order to check whether the input image IIMG is correctly input. The check sums CS1 through CSx may be input with input image IIMG. Alternatively, the check sums CS1 through CSx may be calculated after each of the lines LIN1 through LINx of the ith frame FRMi and i−1th frame FRMi−1 are processed, for example, in response to a horizontal synchronization signal.

In one implementation, first and second representative values RVAL1 and RVAL2 may be check sums CS1 through CSx of lines LIN1 through LINx of respective ones of the ith frame FRMi and i−1th frame FRMi−1. The check sum CS2 of the second line LIN2 of the ith frame FRMi may be obtained by adding data values of the first line LIN1 and second line LIN2 of the ith frame FRMi. For example, when each of the ith frame FRMi and i−1th frame FRMi−1 includes 1920 lines (x=1920), 1920 check sums CS1 through CSx may exist. When each of lines LIN1 through LINx of the ith frame FRMi and i−1th frame FRMi−1 have a size of 1080 bits, each of the check sums CS1 through CSx may have a size of 3 or 24 bits.

The determining unit 120 may compare check sums CS1 through CSx according to the lines LIN1 through LINx of the ith frame FRMi and i−1th frame FRMi−1. When a check sum of an arbitrary line is different, the determining unit 120 may generate the first comparative value CVAL1 to have a low logical value L. When the check sums CS1 through CSx of lines LIN1 through LINx of the ith frame FRMi and i−1th frame FRMi−1 are the same, determining unit 120 may generate the first comparative value CVAL to have a high logical value H. Because sizes of check sums CS1 through CSx may be less than those of the data of lines LIN1 through LINx, resources assigned to generate the first comparative value CVAL1 may be small under some conditions. Accordingly, because check sums CS1 through CSx of the ith frame FRMi and the i−1th frame FRMi−1 are compared, less resources may be used to determine whether the ith frame FRMi and the i−1th frame FRMi−1 are the same.

Figure 7:
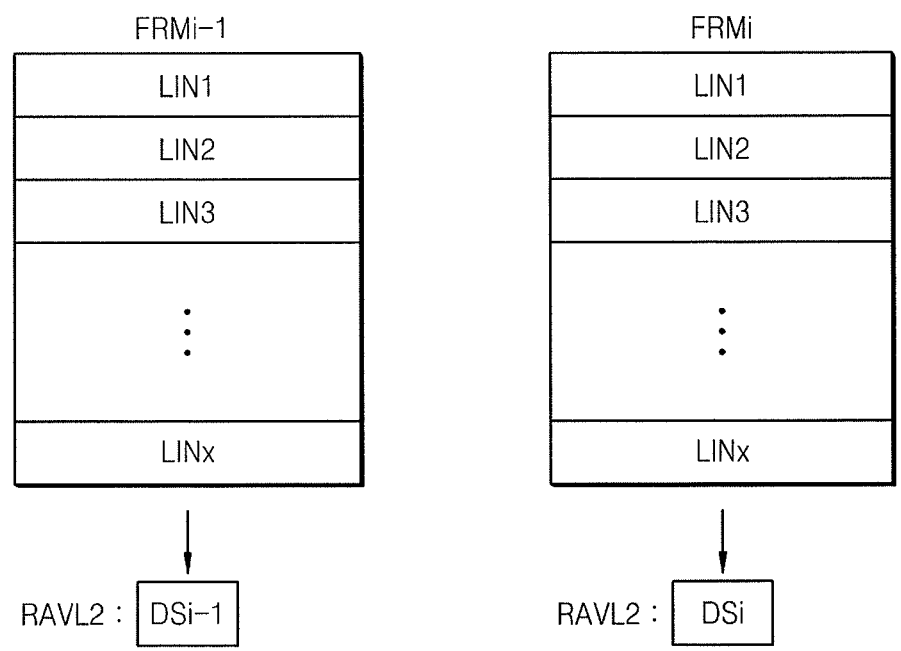

Referring to FIG. 7, first and second representative values RVAL1 and RVAL2 may respectively be data sums DSi and DSi−1 of the ith frame FRMi and i−1th frame FRMi−1. The data sums DSi and DSi−1 of the ith and i−1th frames FRMi and FRMi−1 may be produced by adding the check sums CS1 through CSx of lines LIN1 through LINx after check sums CS1 through CSx of FIG. 6 are calculated with respect to lines LIN1 through LINx of the ith and i−1th frames FRMi and FRMi−1. The determining unit 120 may compare the data sums DSi and DSi−1 of the ith frame FRMi and i−1th frame FRMi−1, and generate the first comparative value CVAL1 to have a low logical value L when the data sums DSi and DSi−1 are different. When the data sums DSi and DSi−1 are the same, determining unit 120 may generate the first comparative value CVAL1 to have a high logical value H.

Figure 8:
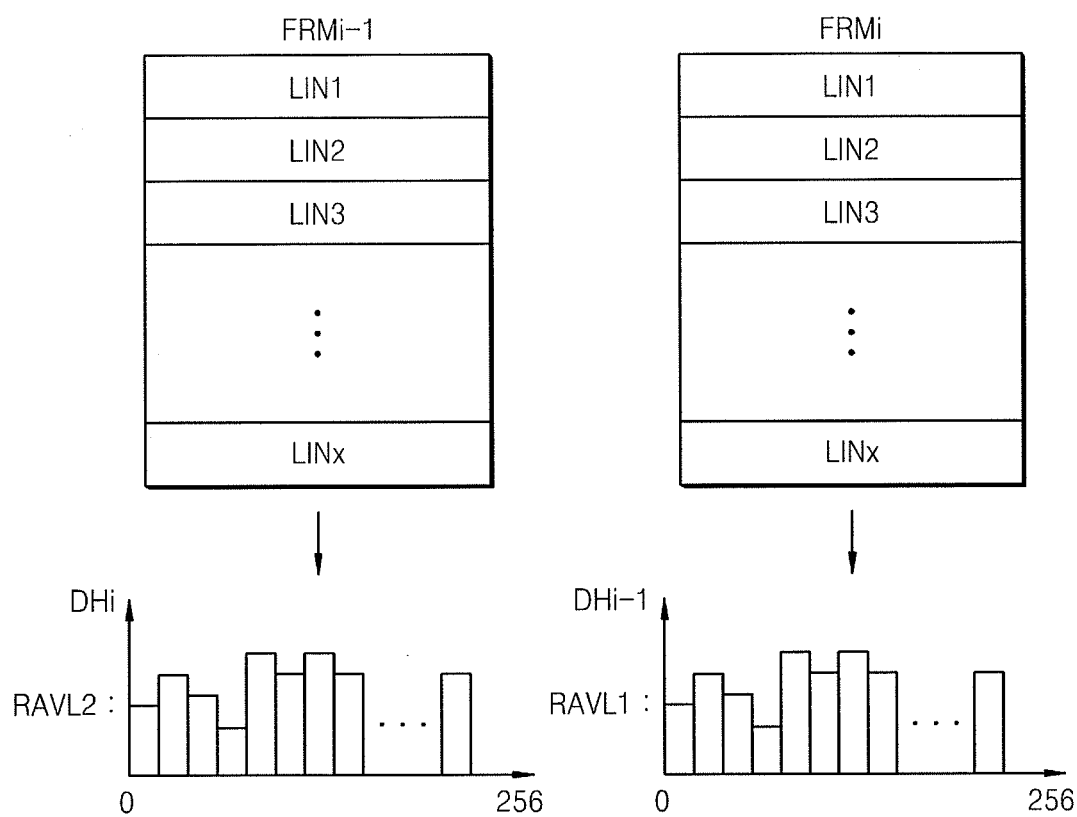

Referring to FIG. 8, in one embodiment, first and second representative values RVAL1 and RVAL2 may respectively correspond to data histograms DHi and DHi−1 of the ith and i−1th frames FRMi and FRMi−1. The data histograms DHi and DHi−1 may respectively indicate numbers of pixels having pixel values corresponding to gray scale values of the ith and i−1th frames FRMi and FRMi−1. The determining unit 120 may compare the data histograms DHi and DHi−1 and generate the first comparative value CVAL1 to have a low logical value L when the data histograms DHi and DHi−1 are different. When the data histograms DHi and DHi−1 are the same, determining unit 120 may generate the first comparative value CVAL to have a high logical value H.

Figure 9:
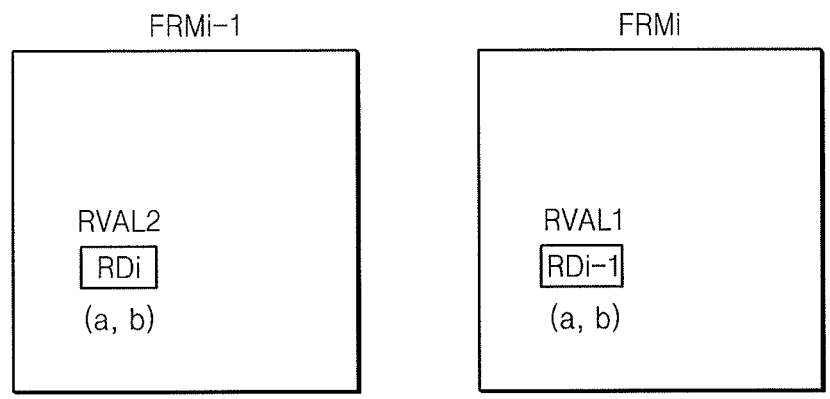

Referring to FIG. 9, first and second representative values RVAL1 and RVAL2 may respectively be random address data RDi and RDi−1 of the ith and i−1th frames FRMi and FRMi−1. The random address data RDi and RDi−1 of the ith and i−1th frames FRMi and FRMi−1 may respectively be pixel values of arbitrary coordinates (a, b), e.g., coordinates (a, b) of arbitrary pixels in the ith and i−1th frames FRMi and FRMi−1. The determining unit 120 may compare the random address data RDi and RDi−1 of the ith and i−1th frames FRMi and FRMi−1, and generate the first comparative value CVAL1 to have a low logical value L when the random address data RDi and RDi−1 are different. When the random address data RDi and RDi−1 of the ith and i−1th frames FRMi and FRMi−1 are the same, determining unit 120 may generate the first comparative value CVAL to have a high logical value.

Referring again to FIGS. 1 and 4, the first comparison unit 122 may transmit the first comparative value CVAL1 to the second comparison unit 124. When the first comparative value CVAL1 indicates that the first and second representative values RVAL1 and RVAL2 are the same (e.g., when the first comparative value CVAL1 has a high logical value H), the second comparison unit 124 may output a second comparative value CVAL2 when a comparison between the ith frame FRMi and i−1 th frame FRMi−1 indicates that these frames are the same. For example, when the ith and i−1th frames FRMi and FRMi−1 are the same, the second comparison unit 124 may generate the second comparative value CVAL2 to have a first logical value (e.g., H). When the ith and i−1th frames FRMi and FRMi−1 are different, the second comparison unit 124 may generate the second comparative value CVAL2 to have a second logical value (e.g., L). The ith and i−1th frames FRMi and FRMi−1 may be compared by determining whether pixel values of same pixels (coordinates) of the ith and i−1th frames FRMi and FRMi−1 are the same.

Figure 10:
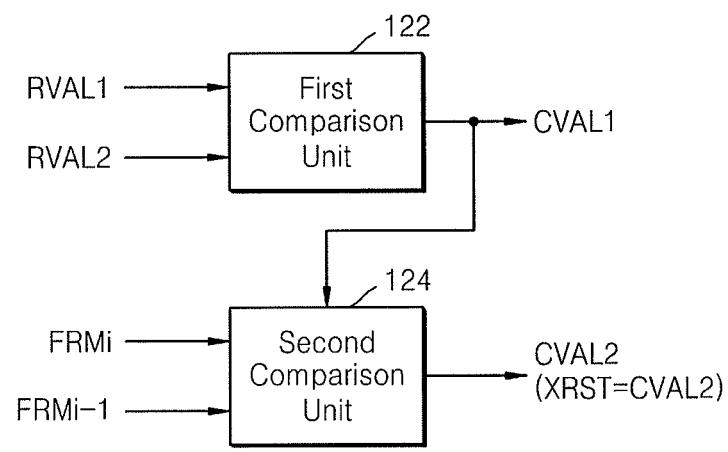
FIGS. 10-12 illustrate examples of determination results for a first comparative value and a second comparative value of FIG. 4 according to one embodiment.
Figure 11:
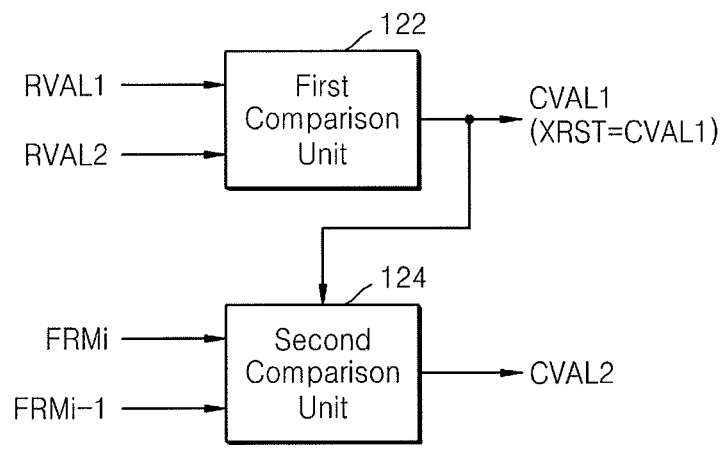
Figure 12:
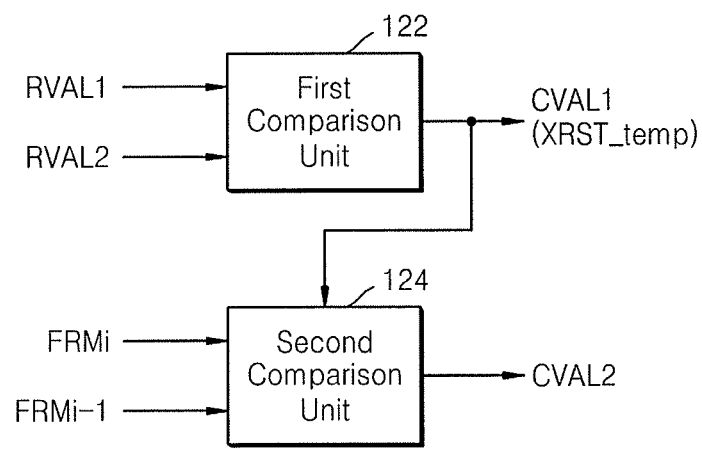

FIGS. 10 through 12 illustrate examples of determination results XRST according to the first comparative value CVAL1 and second comparative value CVAL2 of FIG. 4 according to different embodiments. Referring to FIGS. 1 and 10, as described above, second comparison unit 124 generates the second comparative value CVAL2 based on a determination of whether the ith and i−1th frames FRMi and FRMi−1 are the same. The determination result XRST may correspond to the second comparative value CVAL2. When the second comparative value CVAL2 has a low logical value L (e.g., when the second comparative value CVAL2 indicates that the ith and i−1th frames FRMi and FRMi−1 are not the same), the determination result XRST may indicate that the input image IIMIG is a moving image MIMG. When the second comparative value CVAL2 has a high logical value H (e.g., when the second comparative value CVAL2 indicates that the ith and i−1th frames FRMi and FRMi−1 are the same), the determination result XRST may indicate that input image IIMG is a still image SIMG.

Referring to FIGS. 1 and 11, as described above, first comparison unit 122 generates the first comparative value CVAL1 based on a determination of whether the first and second representative values RVAL1 and RVAL2 are the same. The determination result XRST may correspond to the first comparative value CVAL1. When the first comparative value CVAL1 has a low logical value L (e.g., when the first comparative value CVAL1 indicates that the first and second represent values RVAL1 and RVAL2 are not the same), the determination result XRST may indicate that input image IIMG is a moving image MIMG. When the first comparative value CVAL1 has a high logical value H (e.g., when the first comparative value CVAL1 indicates that the first and second represent values RVAL1 and RVAL2 are the same), the first comparative value CVAL1 is not processed as the determination result XRST.

Referring to FIGS. 1 and 12, the first comparison unit 122 may compare the first and second representative values RVAL1 and RVAL2. When the first and second representative values RVAL1 and RVAL2 are the same, the first comparative value CVAL1 may be generated to have a high logical value H. As described above, in this case, the first comparative value CVAL1 is not processed as the determination result XRST. However, when the first and second representative values RVAL1 and RVAL2 are the same, the first comparative value CVAL1 may be processed as a temporary determination result XRST_temp.

Figure 13:
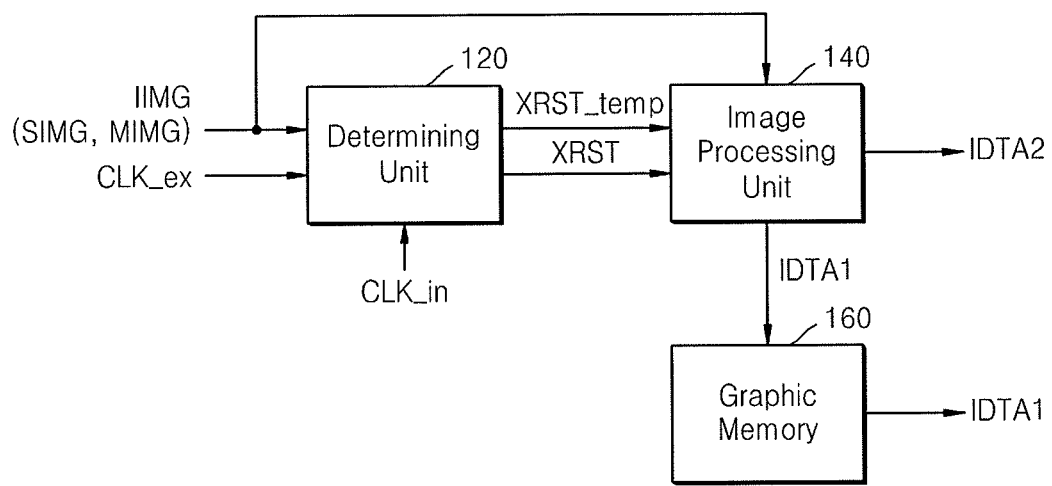
FIG. 13 illustrates operations which may be performed the image driving device of FIG. 1 based on a temporary determination result.

FIG. 13 illustrates additional operations of the image driving device 100 relating to a temporary determination result XRST_temp. Referring to FIGS. 12 and 13, in one embodiment, when the first and second representative values RVAL1 and RVAL2 are the same, determining unit 120 may transmit the first comparative value CVAL1 to the image processing unit 140 as a temporary determination result XRST_temp. The image processing unit 140 may image-process and store the ith frame FRMi in graphic memory 160, even though input image IIMG has not yet been determined to be a moving image MIMG or still image SIMG, in response to temporary determination result XRST_temp.

In this case, operation speed may be increased if the time to generate determination result XRST by determining unit 120 is greater than a time to process an image by image processing unit 140, a time to store first image data IDTA1 processed by image processing unit 140 in graphic memory 160, or a sum of a time to process an image by image processing unit 140 and a time to store first image data IDTA1 in graphic memory 160.

Figure 14:
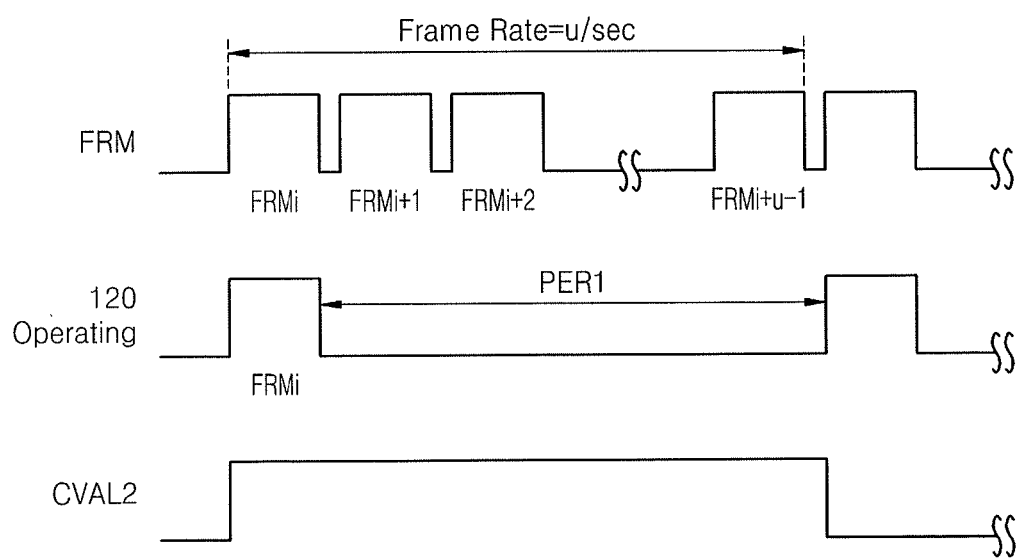
FIG. 14 illustrates a timing diagram of an operation of a second comparison unit of FIG. 4 according to one embodiment.

FIG. 14 illustrates a timing diagram of an operation of the second comparison unit 124 according to one embodiment. Referring to FIGS. 4 and 14, once it is determined that the ith and i−1th frames FRMi and FRMi−1 are the same, the second comparison unit 124 may not compare the ith and i−1th frames FRMi and FRMi−1 during a first period PER1, even when the first comparative value CVAL1 indicates that the first and second representative values RVAL1 and RVAL2 are the same. The first period PER1 may correspond, for example, to a frame rate of the input image IIMG.

In one implementation, when the input image IIMG has u frames per second, the first period PER1 may correspond to an activation section of a vertical synchronization signal with respect to u−1 frames from an i+1th frame FRMi+1−1 to an i+u−1th frame FRMi+u. Each frame of the input image IIMG is processed in response to the vertical synchronization signal. In other words, when it is determined that the ith and i−1th frames FRMi and FRMi−1 are the same, the second comparison unit 124 does not perform the comparison during the first period PER1, and may maintain the second comparative value CVAL2 for the ith frame FRMi.

The second comparative value CVAL2 for the ith frame FRMi may be stored in an arbitrary storage area in the second comparison unit 124, and may repeatedly output from the i+1th frame FRMi+1 to the i+uth frame FRMi+u. The arbitrary storage area may be, for example, a register or a latch. The second comparison unit 124 may include an output area or device for maintaining an output of the second comparative value CVAL2 for the ith frame FRMi. Because the second comparison unit 124 does not perform the comparison during the first period PER1 by reflecting characteristics of the still image SIMG, current consumption or power consumption during the comparison of the second comparison unit 124 may be reduced.

Figure 15:
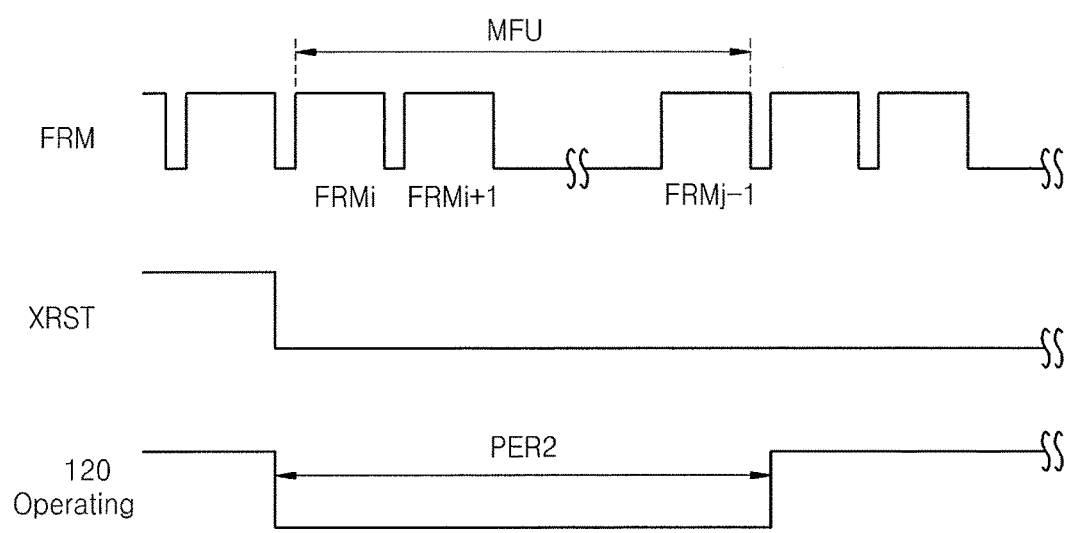
FIG. 15 illustrates a timing diagram of an operation of the determining unit of FIG. 4 according to one embodiment.

FIG. 15 illustrates a timing diagram of an operation of determining unit 120 according to another embodiment. Referring to FIGS. 4 and 15, when the determination result XRST of determining the ith frame FRMi indicates that the input image IIMG is a moving image MIMG, determining unit 120 may not determine whether the input image IIMG is a moving image MIMG or still image SIMG during a second period PER2 corresponding to a least frame unit LFU set with respect to the moving image MIMG.

For example, when the first comparison unit 122 generates the first comparative value CVAL1 to have a low logical value L or the second comparison unit 124 generates the second comparative value CVAL2 to have a low logical value L, the first or second comparison unit 122 or 124 may not determine whether the input image IIMG is a moving image MIMG or still image SIMG during the second period PER2.

In one implementation, when the least frame unit LFU is set to be j frames, the second period PER2 may correspond to an activation section of a vertical synchronization signal with respect to j−1 frames from the i+1th frame FRMi+1 to the i+j−1th frame FRMi+j−1. Based on format characteristics of the moving image MIMG, an arbitrary number of consecutive frames may be the same. The least frame unit LFU may be set by reflecting such characteristics of the moving image MIMG. For example, when a frame rate of the image driving device 100 is 60 fps, the least frame unit LUF may be set to 15 or 30 frames.

The first or second comparison unit 122 or 124 (e.g., determining unit 120) may not determine whether the input image IIMG is a moving image MIMG or still image SIMG during the second period PER2, and may output the first or second comparative value CVAL1 or CVAL2 in the same logic level as the determination result XRST. In this case, the determination result XRST with respect to the ith frame FRMi may be stored in an arbitrary storage area in determining unit 120, and repeatedly output from the i+1th frame FRMi+1 to the i+j−1th frame FRMi+j−1. The arbitrary storage area may be, for example, a register or a latch.

The determining unit 120 may include an output area or device for maintaining an output of the determination result XRST with respect to the ith frame FRMi. Because the determining unit 120 does not perform determining during the second period PER2 by reflecting characteristics of the moving image MIMG, current consumption or power consumption during the determining of the determining unit 120 may be reduced.

Referring again to FIGS. 1 and 4, as described above, the second comparison unit 124 compares whether the ith and i−1th frames FRMi and FRMi−1 are the same. For example, the i−1th frame FRMi−1 may be input to the second comparison unit 124 as the first image data IDTA1 stored in the graphic memory 160 is scanned.

When the i−1th frame FRMi−1 is a frame of a still image SIMG, image processing unit 140 may image-process the i−1th frame FRMi−1 and output the first image data IDTA1 corresponding to the i−1th frame FRMi−1. The first image data IDTA1 corresponding to the i−1th frame FRMi−1 is stored in graphic memory 160. When the i−1th frame FRMi−1 is a frame of the moving image MIMG, image processing unit 140 may image-process the i-th frame FRMi−1 and output second image data IDTA2 corresponding to the i−1th frame FRMi−1. As described above, second image data IDTA2 is not stored in graphic memory 160.

Figure 16A:
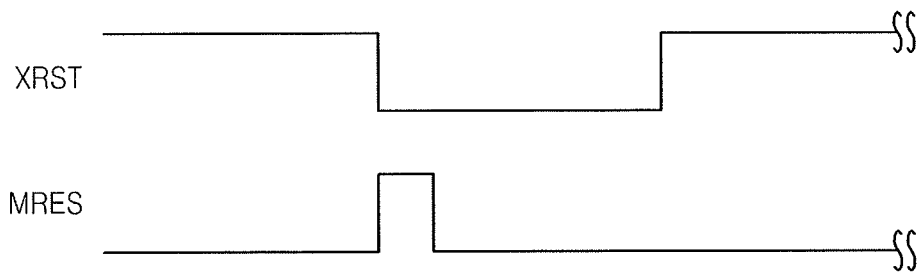
FIGS. 16A-16C illustrate examples of operations performed when an i−1th frame of FIG. 4 is a moving image.
Figure 16B:
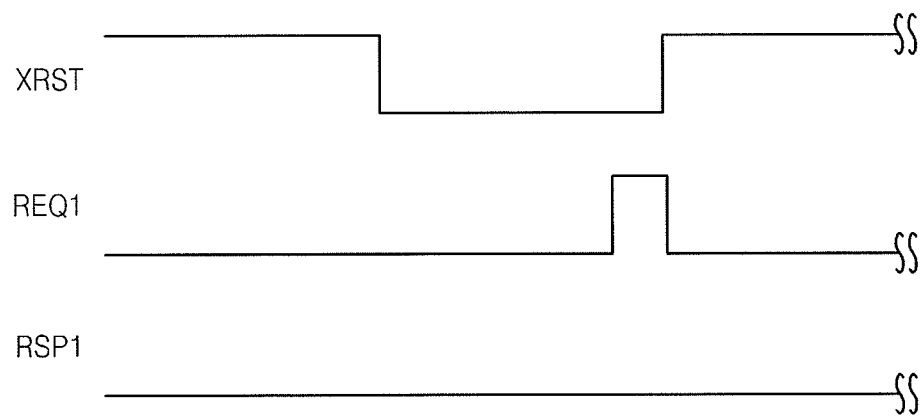
Figure 16C:
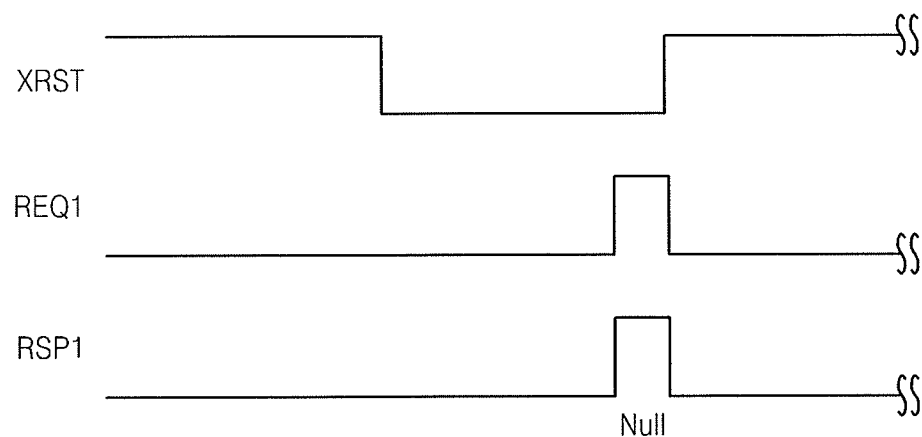

FIGS. 16A through 16C illustrate embodiments of operations that may be performed when the i−1th frame FRMi−1 is a moving image MIMG. Referring to FIGS. 1, 4, and 16A, when the determination result XRST changes from indicating that the input image IIMG is a still image SIMG to indicating that the input image IIMG is a moving image MIMG (e.g., when determination result XRST changes from a high logical value H to a low logical value L), graphic memory 160 may be reset in response to activation of a memory reset signal MRES. Accordingly, the first image data IDTA1 stored in the graphic memory 160 is erased.

As described above, when the input image IIMG is a moving image MIMG, the first comparative value CVAL1 may be output as a low logical value L. In response to the low logical value L of the first comparative value CVAL1, second comparison unit 124 does not determine whether the ith and i−1th frames FRMi and FRMi−1 are the same. However, after graphic memory 160 is reset and the first comparative value CVAL1 for the ith frame FRMi is output as a high logical value H, second comparative unit 124 may not determine whether the ith and i−1th frames FRMi and FRMi−1 are the same and may output second comparative value CVAL2 to have high logical value H.

Then, the ith frame FRMi is processed as a frame of the still image SIMG. Accordingly, the first image data IDTA1 with respect to the ith frame FRMi may be stored in graphic memory 160. Thus, even when the determination result XRST with respect to the ith frame FRMi is not accurately generated due to reset of graphic memory 160, the determination result XRST may be accurately generated from the i+1th frame FRMi+1.

Alternatively, as described above with reference to FIG. 12, by transmitting first comparative value CVAL1 to image processing unit 140 as temporary determination result XRST_temp, the first image data IDTA1 image-processed for the ith frame FRMi may be first stored in graphic memory 160. In this case, the second comparison unit 124 compares the ith frame FRMi and first image data IDTA1 for the ith frame FRMi scanned from graphic memory 160, thereby outputting the second comparative value CVAL2 to have a high logical value H. Similarly, even when the determination result XRST for the ith frame FRMi is not accurately generated, the determination result XRST may be accurately generated from the i+1th frame FRMi+1.

Even when the determination result XRST for the ith frame FRMi is not accurate, reliability or power consumption of the image driving device 100 is not affected. More specifically, even when it is not determined whether the ith frame FRMi is a frame of a still image SIMG or moving image MIMG, the ith frame FRMi is image-processed and stored in graphic memory 160 by image processing unit 140 when the ith frame FRMi is a frame of the still image SIMG. Based on this determination result, the ith frame FRMi may be processed without an increase of power consumption.

Also, because only power consumption for processing one frame is increased, even when it is not determined whether the ith frame FRMi is a frame of a still image SIMG or moving image MIMG, the ith frame FRMi is image-processed and stored in graphic memory 160 by image processing unit 140 when the ith frame FRMi is a frame of still image SIMG. Based on this determination result, power is consumed only to store one frame in the graphic memory 160. Accordingly, determining unit 120 may generate determination result XRST, even when a frame of a moving image MIMG is not stored in graphic memory 160.

In FIG. 16A, graphic memory 160 is reset when the determination result XRST changes from a high logical value H to a low logical value L, but this is not necessary. For example, even when the determination result XRST changes from a high logical value H to a low logical value L, graphic memory 160 may not be reset. Alternatively, as shown in FIG. 16B or 16C, even when the determination result XRST changes from a high logical value H to a low logical value L, first image data IDRA1 may be maintained and the first comparative value CVAL1 for the ith frame FRMi may be output as a high logical value H. Thus, when the first image data IDTA1 is requested to be transmitted to the second comparison unit 124, graphic memory 160 may ignore a corresponding request REQ1 or may transmit a response RSP with a null value for request REQ1.

Figure 17A:
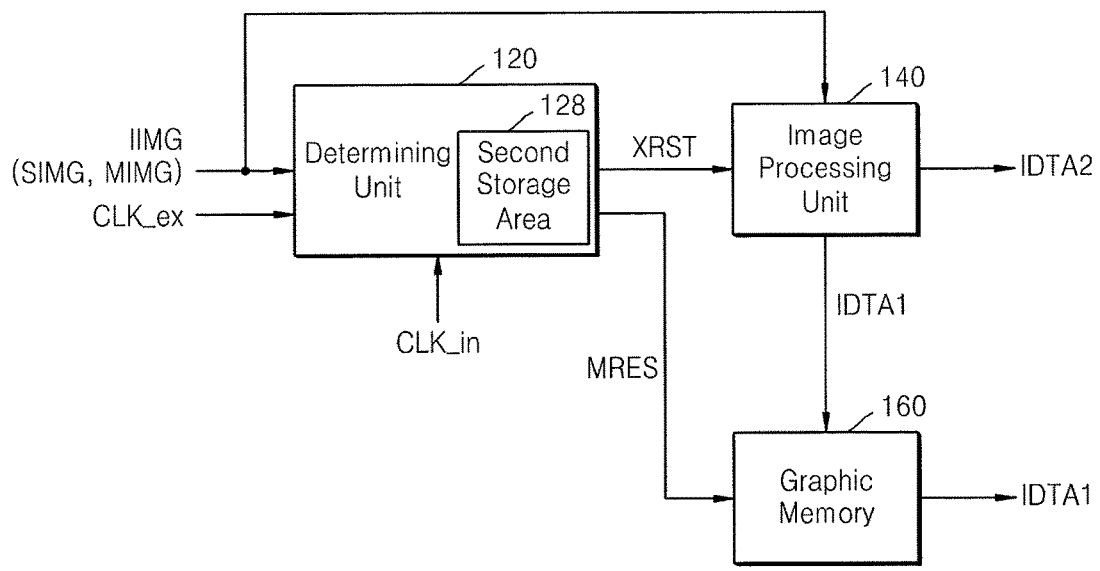
FIGS. 17A-17B illustrate the operation of FIG. 16A performed by the image driving device of FIG. 1.
Figure 17B:
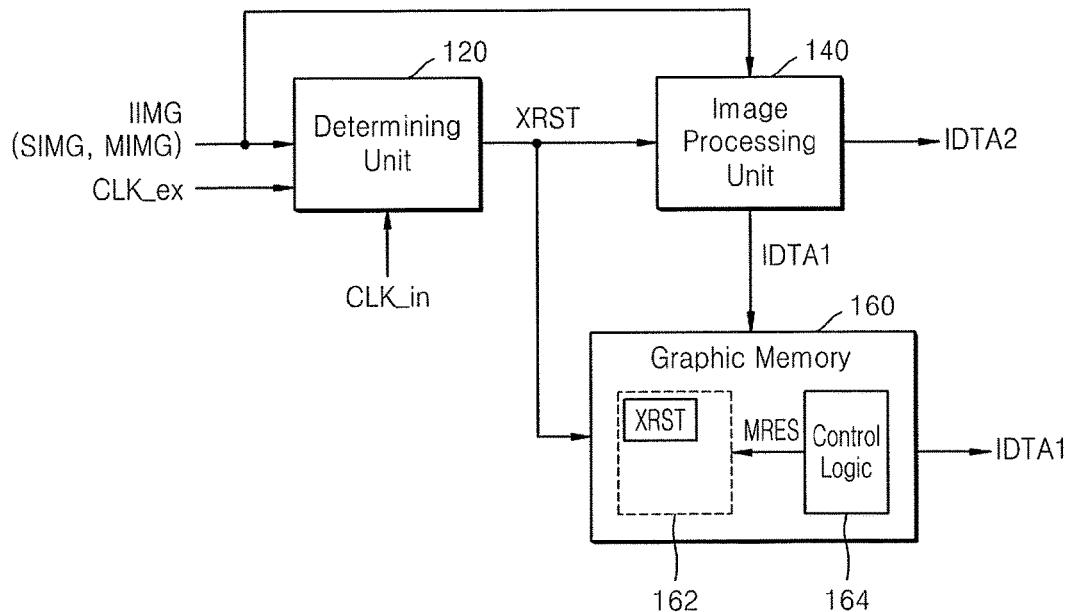

FIGS. 17A and 17B illustrate additional operations of image driving device 100. First, referring to FIGS. 1, 16A, and 17A, when input image IIMG changes from a still image SIMG to a moving image MIMG (e.g., when the determination result XRST changes from a high logical value H to a low logical value L), image driving device 100 resets graphic memory 160. Thus, the determination result XRST may be stored. The determining unit 120 may further include a second storage area 128 for storing the determination result XRST. In other embodiments, the second storage area 128 may be located outside and coupled to determining unit 120. The second storage area 128 may be, for example, a register or a latch.

The determining unit 120 may compare determination results stored in the second storage area 128 (e.g., determination result XRST for the i-1th frame FRMi-1 and determination result XRST for the ith frame FRMi) and activate the memory reset signal MRES when the determination results are the same. As described above, the first image data IDTA1 stored in graphic memory 160 may be erased in response to the activation of the memory reset signal MRES.

Referring to FIGS. 1, 16A, and 17B, unlike FIG. 17A, the determination result XRST may be stored in graphic memory 160. The determining unit 120 may transmit the determination result XRST to graphic memory 160. The graphic memory 160 may include a memory cell array 162 for storing the first image data IDTA1, and control logic 164 for controlling storage and scanning of memory cell array 162. In FIG. 17B, the determination result XRST may be stored in an arbitrary region of memory cell array 162 of graphic memory 160.

In one implementation, the determination result XRST may be stored in an arbitrary region of control logic 164. The control logic 164 may compare determination results (e.g., determination results XRST for the i-1th and ith frames FRMi-1 and FRMi). When the determination results are the same, control logical 164 may activate and apply memory reset signal MRES to memory cell array 162 to erase the stored first image data IDTA1.

Figure 18:
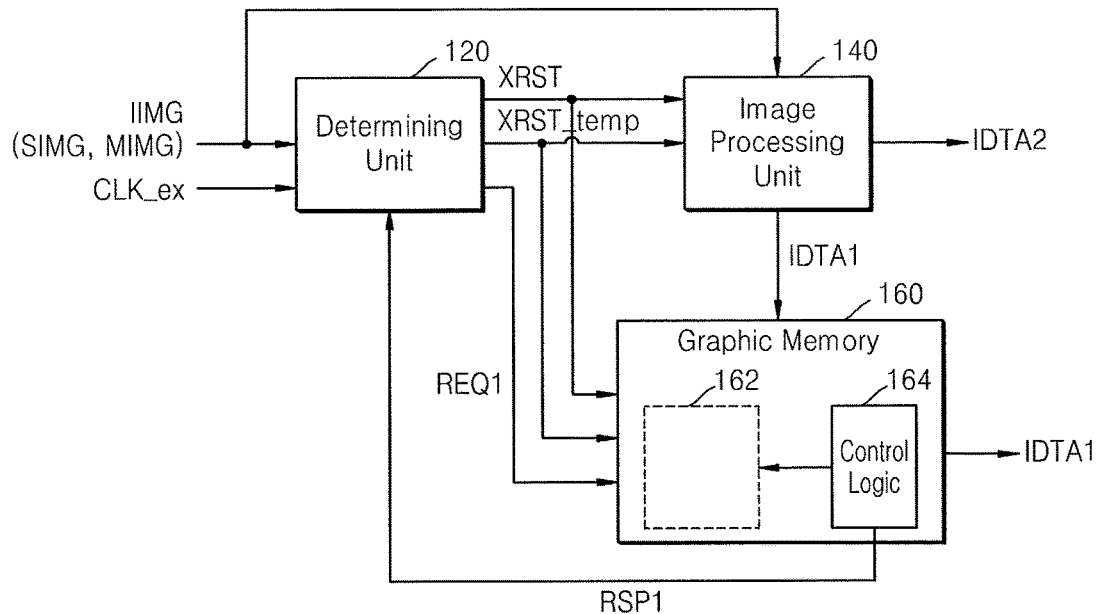
FIG. 18 illustrates the operations of FIGS. 16B and 16C performed by the image driving device of FIG. 1.

FIG. 18 illustrates additional operations of image driving device 100. First, referring to FIG. 1, 4, 16B or 16C, and 18, after input image IIMG changes from a still image SIMG to a moving image MIMG (e.g., after determination result XRST changes from a high logical level H to a low logical level L), image driving device 100 may generate the first comparative value CVAL1 for the ith frame FRMi to have a high logical value H. Because the second comparison unit 124 receives the first image data IDTA1, a scan request REQ1 on the first image data IDTA1 may be applied to graphic memory 160. In FIG. 18, the scan request REQ1 is directly applied from determining unit 120 to graphic memory 160, but this may not be so in other embodiments. The scan request REQ1 may be applied to graphic memory 160 by a separate control logic, such as a control unit 190 of FIG. 25, of the image driving device 100.

The graphic memory 160 may ignore the scan request REQ1, or may transmit a null value to the determining unit 120 or the second comparison unit 124 as a response RSP on the scan request REQ1. However, unlike a normal scan request on graphic memory 160 in other situations, scan request REQ1 may be limited to the first scan request to be transmitted to determining unit 120 or second comparison unit 124 after the logic level of the determination result XRST changes a high logical value H to a low logical value L. The graphic memory 160 may perform a normal scan operation on the normal scan request after the scan request REQ1. A tag may be assigned to the scan request REQ1 in order to classify the scan request REQ1 from the normal scan request.

As shown in FIG. 17B, graphic memory 160 may include memory cell array 162 for storing the first image data IDTA1 and control logic 164 for controlling storage and scanning of memory cell array 162. The response RSP to the scan request REQ1 may be generated by control logic 164. Also, in order for graphic memory 160 to efficiently operate for scan request REQ1, determination result XRST may be stored and referred to from the arbitrary region of memory cell array 162 or logic control 164, as described with reference to FIG. 17B.

Figure 19:
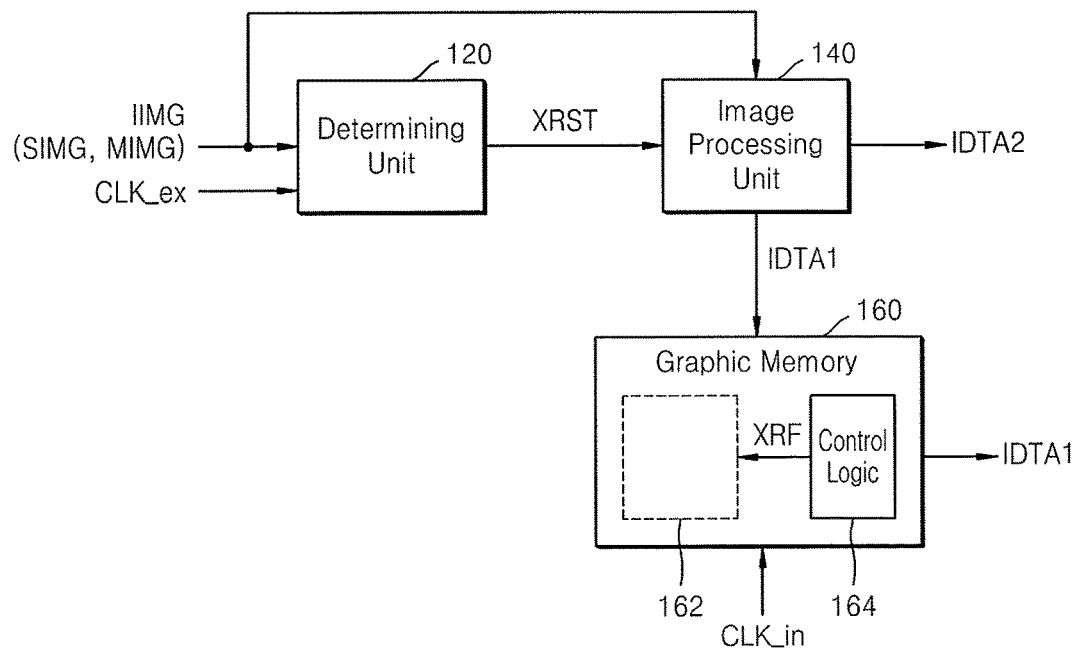
FIGS. 19 and 20 illustrate an operation which may be performed by the graphic memory in FIG. 1 for refreshing first image data.
Figure 20:
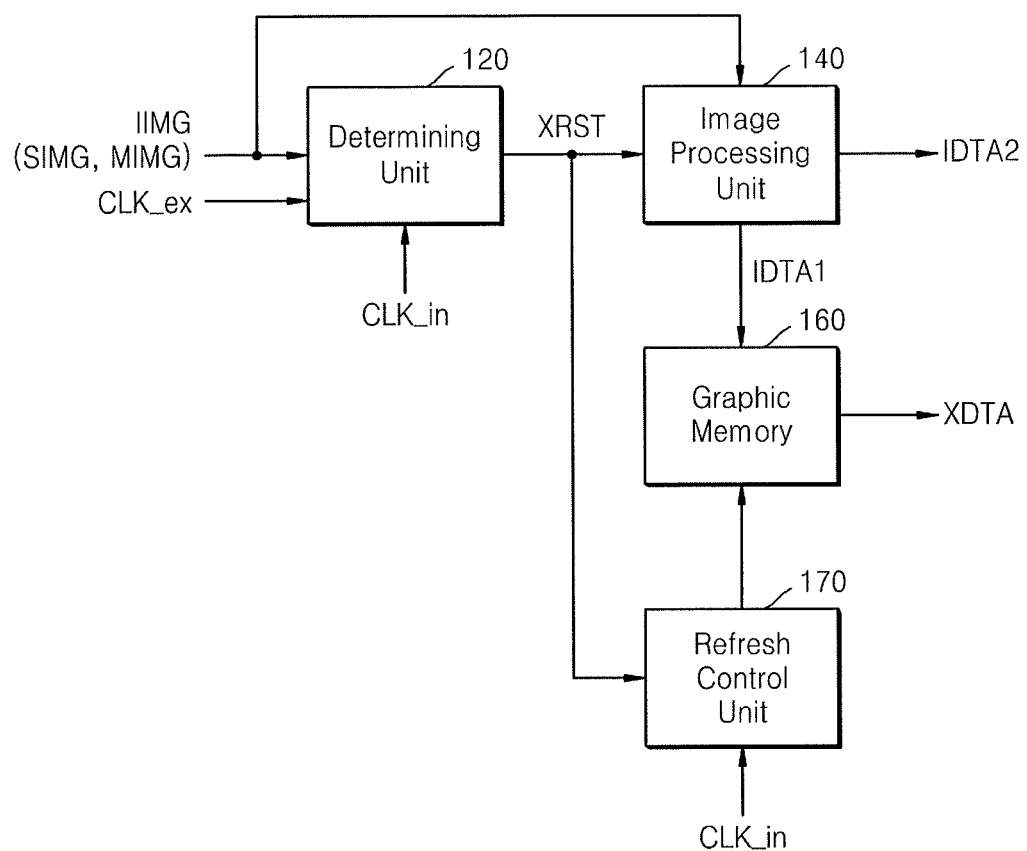

FIGS. 19 and 20 illustrate operations of graphic memory 160 for refreshing first image data IDTA1. First, referring to FIGS. 1, 19, and 20, when input image IIMG is a still image SIMG, image processing unit 140 only image-processes an arbitrary frame of a still image SIMG. For example, image processing unit 140 may only image-process first frame FRM1 of a still image SIMG and output the image-processed first frame FRM1 as first image data IDTA1. The first image data IDTA1 may be stored in graphic memory 160.

The graphic memory 160 may maintain the first image data IDTA1 until the last frame of the still image SIMG is processed, for example, through a refresh operation. For example, as shown in FIG. 19, a self-refresh operation may be performed by being synchronized with the internal clock CLK_in by control logic 164 of graphic memory 160. Alternatively, as shown in FIG. 20, a refresh operation may be performed by being synchronized with the internal clock CLK_in by a refresh control unit 170, separately included in image driving device 100. The refresh operations of FIG. 19 or 20 may be performed based on a period which corresponds to a frame rate of the image driving device 100 or a refresh characteristic of the graphic memory 160.

The graphic memory 160 may have the same size as a frame. For example, when the size of a frame is 1920×1080, the capacity of graphic memory 160 may be 1920×1080.

Alternatively, when the size of the frame is 3840×2160, the capacity of graphic memory 160 may also be 3840×2160. Also, graphic memory 160 may perform writing and scanning in line units. Accordingly, even when graphic memory 160 has a size of one frame, the ith frame FRMi may be written while the i−1th frame FRMi−1 is scanned.

Alternatively, graphic memory 160 may have a size sufficient to store at least two frames, when image driving device 100 is to simultaneously process a plurality of frames or when a resource is to be assigned while image driving device 100 uses a pipeline scheme to process an image. Alternatively, in order to reduce a layout area of image driving device 100, graphic memory 160 may have a size smaller than a frame.

Figure 21:
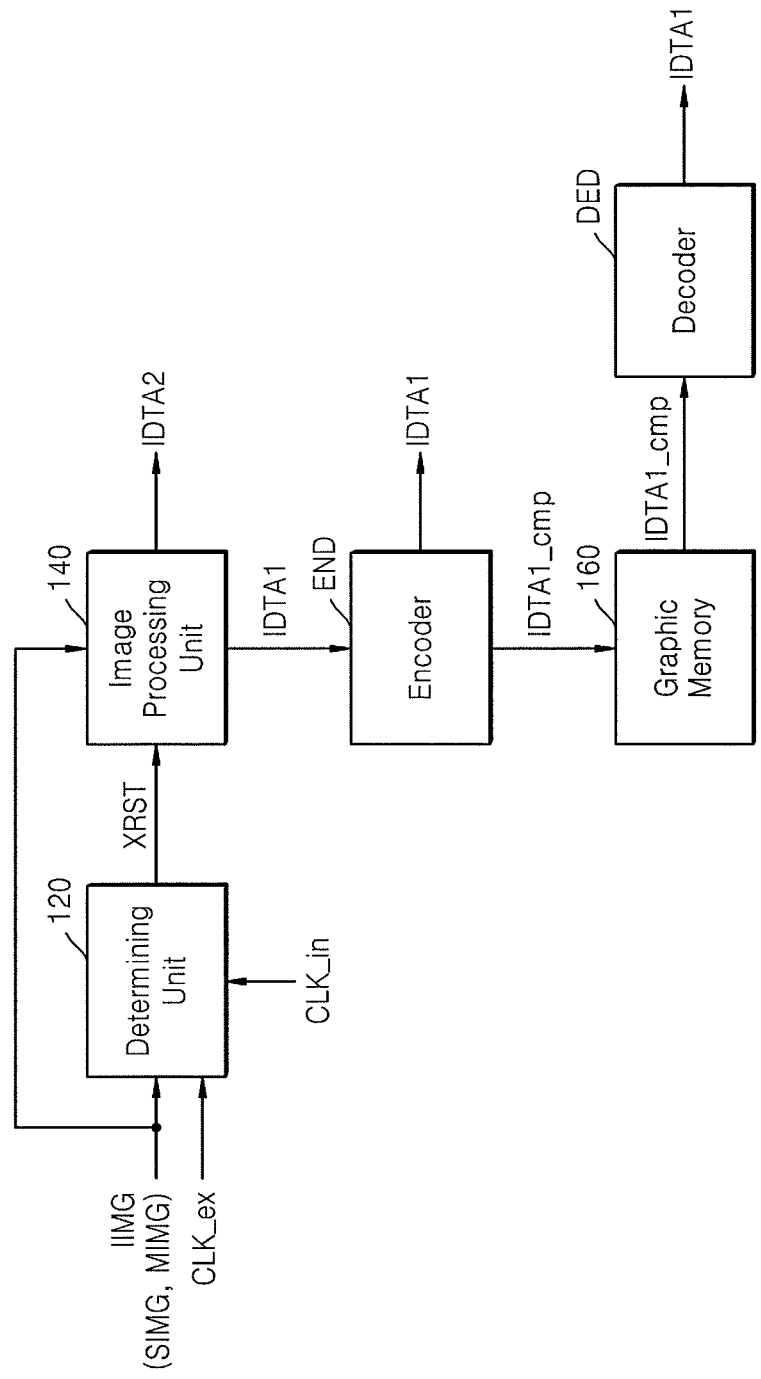
FIG. 21 illustrates an embodiment of a graphic memory.

FIG. 21 illustrates an embodiment of graphic memory 160. In this embodiment, graphic memory 160 may have a size smaller than a frame of input image IIMG. Alternatively, graphic memory 160 may have a size corresponding to a frame of input image IIMG. For example, graphic memory 160 may have a size ¼ of each frame of the input image IIMG. In one implementation, when a size of a frame is 1920×1080, the capacity of graphic memory 160 may be 810×540. When a size of a frame is 3840×2160, the capacity of the graphic memory may be 1920×1080.

Each frame of input image IIMG may be compressed according to the size of the graphic memory 16, so that the frame may be stored in graphic memory 160. The image driving device 100 may include an encoder END for compressing the first image data IDTA1 that is image-processed for an arbitrary frame of the input image IIMG. The compressed first image data IDTA1 may be output as compressed first image data IDTA1_cmp. The image driving device 100 may also include a decoder DED for decoding compressed first image data IDTA1_cmp output from graphic memory 160.

Because the encoder END and decoder DED of FIG. 21 only perform encoding and decoding corresponding to first image data IDTA1, current consumption or power consumption for encoding and decoding other frames of the moving image MIMG or still image SIMG may be reduced.

Figure 22:
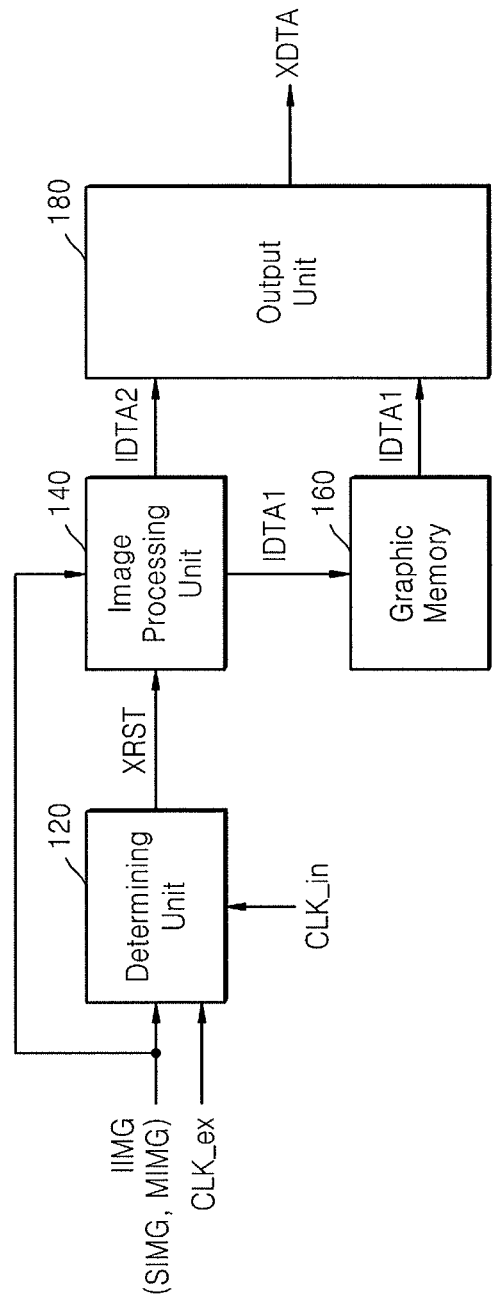
FIG. 22 illustrates an embodiment of an output unit of the image driving device.

FIG. 22 illustrates an embodiment of image driving device 100 which includes an output unit 180. Referring to FIGS. 1 and 22, output unit 180 may output one of the first image data IDTA1 stored in graphic memory 160 or the second image data IDTA1 that is not stored in graphic memory 160. The output unit 180 may directly output output data XDTA based on the data from image processing unit 160. An output channel of image driving device 100 may be used in common for the first image data IDTA1 and second image data IDTA2. The output data XDTA may be displayed on a display device.

Figure 23:
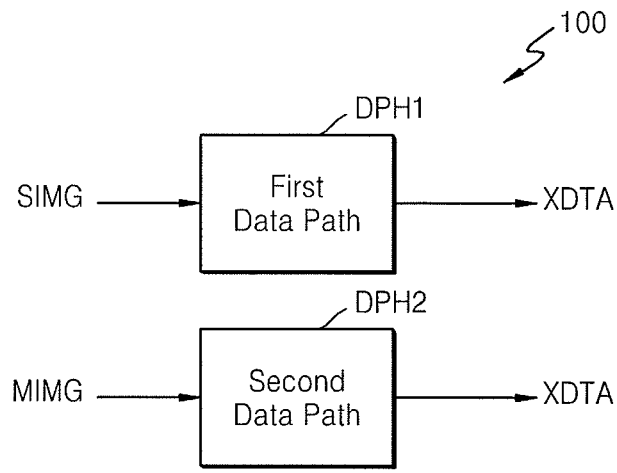
FIGS. 23 and 24 illustrate additionally functions of the image driving device.
Figure 24:
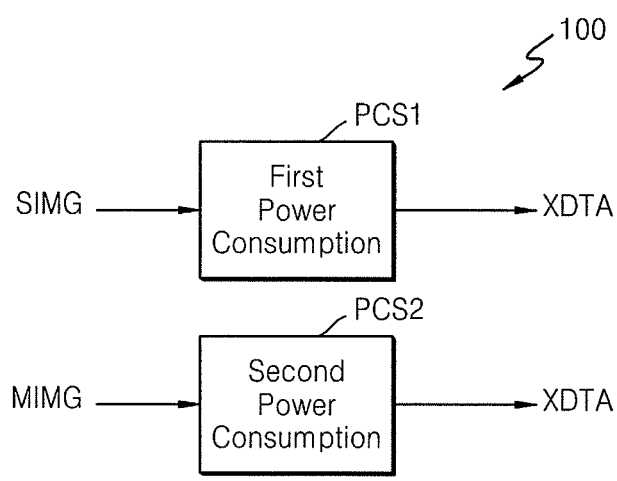

FIGS. 23 and 24 illustrate additional operations performed by image driving device 100. Referring to FIGS. 1 and 23, image driving device 100 may determine whether input image IIMG is a still image SIMG or moving image MIMG. When input image IIMG is a still image SIMP, the image driving device 100 may output image SIMG as output data XDTA through a first data path DPH1. The first data path DPH1 for the first frame FRM1 of still image SIMG may include, for example, a path for image processing unit 140 to process an image, for storing first image data IDTA1 in graphic memory 160, and for scanning and outputting output data XDTA from graphic memory 160 to output unit 180. The first data path DPH1 of a frame of still image SIMG after second frame FRM2 may include, for example, a path for outputting the first image data IDTA1 that is refreshed in graphic memory 160 to output unit 180.

Image driving device 100 may output moving image MIMG as output data XDTA through a second data path DPH2 different from first data path DPH1. The second data path DPH2 of moving image MIMG may include, for example, a path for processing an image by image processing unit 140 and a path for outputting second image data IDTA2 that is image-processed by output unit 180. In this embodiment, therefore, image driving device 100 may perform a process optimized or otherwise customized to each of the still image SIMG and the moving image MIMG.

Then, referring to FIGS. 1 and 24, image driving device 100 may determine whether input image IIMG is a still image SIMG or moving image MIMG, and may output still image SIMG as output data XDTA in first power consumption PCS1. For example, the first power consumption PCS1 of first frame FRM1 of the still image SIMG may be used to process an image by image processing unit 140, to store the first image data IDTA1 that is image-processed in graphic memory 160, and to scan and output the output data XDTA from graphic memory 160 to output unit 180. The first power consumption PCS1 of a frame of the still image SIMG after the second frame FRM2 may be used, for example, to output first image data IDTA1 that is refreshed in graphic memory 160 to output unit 180.

The image driving device 100 may output moving image MIMG as output data XDTA in second power consumption PCS2 different from the first power consumption PCS1. The second power consumption PCS2 of the moving image MIMG may be used, for example, to process an image by image processing unit 140 and to output the second image data IDTA2 that is image-processed to output unit 180. In this embodiment, therefore, image driving device 100 may perform a process optimized or customized to each of the still image SIMG and the moving image MIMG.

Because image driving device 100 does not image-process the frame of still image SIMG after the second frame FRM2, and does not access graphic memory 160 to store the frame of the still image SIMG after the second frame FRM2 or does not access the graphic memory 160 while processing the moving image MIMG, power consumption for performing the same process without classifying the moving image MIMG and the still image SIMG may be reduced.

Alternatively, by classifying and processing the moving image MIMG and still image SIMG, power consumption for driving an image may be reduced, thereby preventing an electromagnetic interference (EMI) phenomenon caused by driving the image. Thus, malfunction of image driving device 100, or an electronic device including image driving device 100, may be prevented.

Alternatively, because image driving device 100 autonomously classifies and processes the moving image MIMG and still image SIMG, a processor for controlling image driving device 100 may have a low load in performing control operations according to the moving image MIMG and the still image SIMG. This may reduce the time required to drive an image. The processor for controlling the image driving device 100 may not be synchronized with image driving device 100. Thus, even when the moving image MIMG and still image SIMG are classified by the processor, the load of image driving device 100 for separately processing the moving image MIMG and still image SIMG may be considerable under some circumstances.

Figure 25:
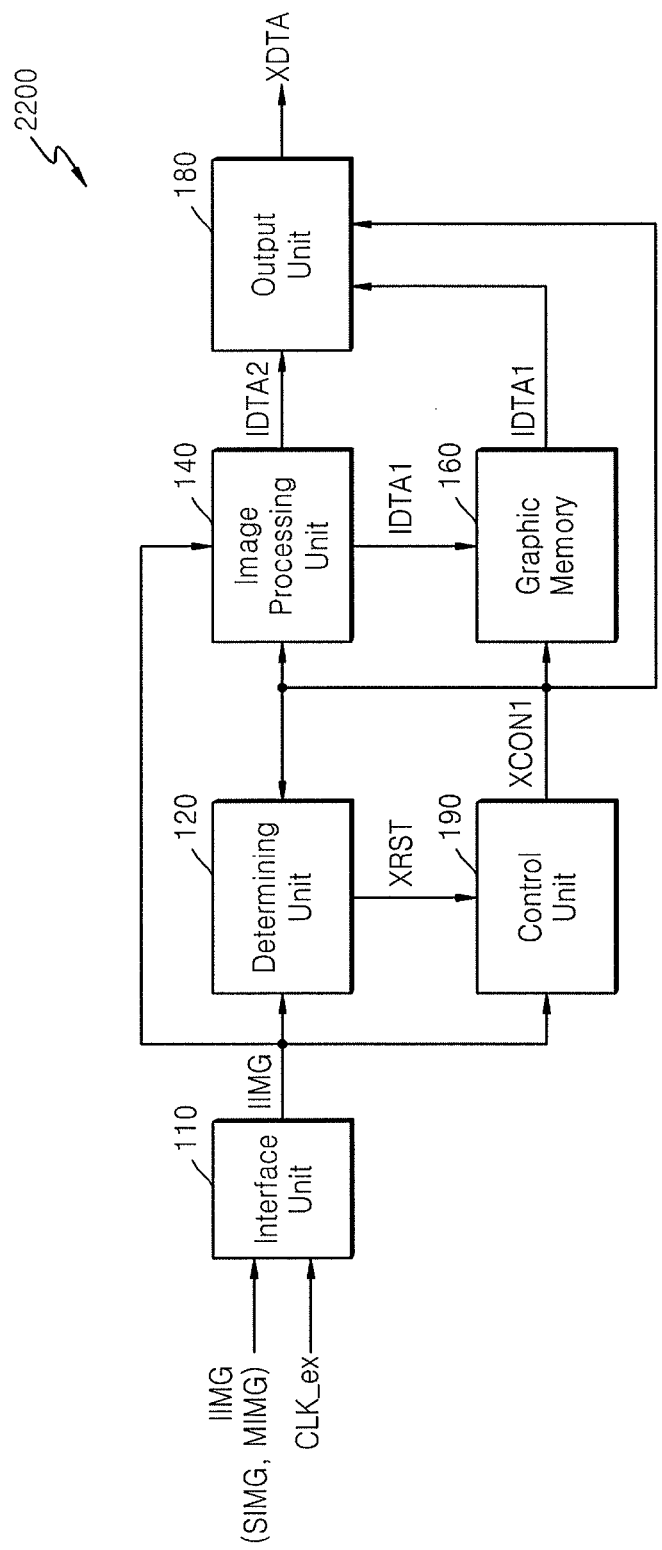
FIG. 25 illustrates another embodiment of an image driving device.

FIG. 25 illustrates another embodiment of an image driving device 2200 which includes an interface unit 110, determining unit 120, image processing unit 140, graphic memory 160, output unit 180, and a control unit 190. The interface unit 110 may receive input image IIMG from outside interface unit 110, and may transmit the input image IIMG to determining unit 120, image processing unit 140, and control unit 190. The interface unit 110 may receive the input image IIMG through, for example, a high speed serial interface (HSSI). Because interface unit 110 interfaces through the HSSI, the interface unit 110 may have a high transmission rate and low electromagnetic interference (EMI).

When image driving device 2200 is included in a mobile device, interface unit 110 may receive input image IIMG and external clock CLK_ex from a processor of the mobile device through, for example, a mobile industry processor interface (MIPI) from among the HSSI. Accordingly, because image driving device 200 communicates with a processor via the HSSI, battery consumption of the mobile device including image driving device 2200 may be reduced, and signal processing speed may be increased.

Like determining unit 120 in FIG. 1, determining unit 120 in FIG. 25 outputs determination result XRST by determining whether input image IIMG is a still image SIMG or moving image MIMG. A method of determining whether the input image IIMG is a still image SIMG or moving image MIMG may be as previously described. For example, when input image IIMG is a still image SIMG, determination result XRST may be output to have a high logical value H. When input image IIMG is a moving image MIMG, determination result XRST may be output as a low logical value L.

The input image IIMG may be input by being synchronized with external clock CLK_ex. For example, external clock CLK_ex may be an operation clock of an apparatus or system which includes image driving device 2200. In one implementation, external clock CLK_ex may be an operation clock of an application processor of the apparatus or system including image driving device 2200.

The image processing unit 140 may image-process some frames FRM# of the first through nth frames FRM1 through FRMn for a still image SIMG, and may image-process all of first through mth frames FRM1 through FRMm for a moving image MIMG, in response to a first control signal XCON1. In one embodiment, image processing unit 140 may image-process only first frame FRM1 of a still image SIMG. For example, because image processing unit 140 image-processes some frames FRM# of a still image SIMG and all of first through mth frames FRM1 through FRMm of a moving image MIMG, image deterioration caused by, for example, a sun line effect, flash effect, film mode, panning, or scene change may be compensated for.

Graphic memory 160 may or may not store data that is image-processed by image processing unit 140 based on whether input image IIMG is a still image SIMG or moving image MIMG. In one embodiment, graphic memory 160 may only store first image data IDTA1 corresponding to a still image SIMG.

Output unit 180 may output one of the first image data IDTA1 or the second image data IDTA2 as output data XDTA of input image IIMG, in response to first control signal XCON1.

Control unit 190 may generate first control signal XCON1 in response to determination result XRST. The first control signal XCON1 may be applied to determining unit 120, image processing unit 140, graphic memory 160, and output unit 180. In response to the first control signal XCON1, determining unit 120 may perform operations described above with reference to FIGS. 1, 4, 12, 14, 15, 17A, and 18, image processing unit 140 may image-process different numbers of frames with respect to a still image SIMG and moving image MIMG, and graphic memory 160 may perform operations described above with reference to FIGS. 1, 17B, and 18 through 20.

Figure 26:
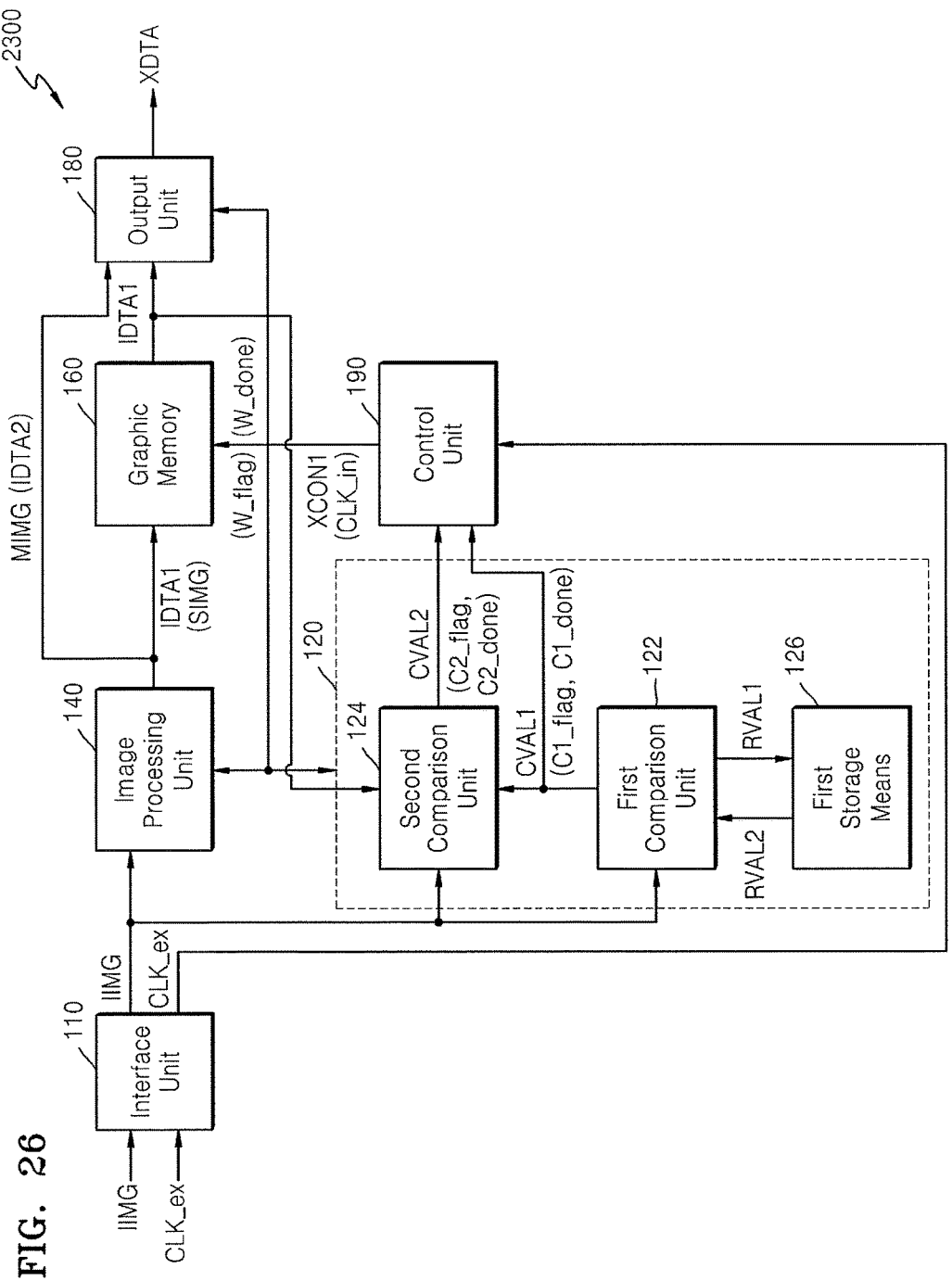
FIG. 26 illustrates another embodiment of an image driving device.

FIG. 26 illustrates another embodiment of an image driving device 2300 which includes interface unit 110, determining unit 120, image processing unit 140, graphic memory 160, output unit 180, and control unit 190. The interface unit 110, determining unit 120, image processing unit 140, graphic memory 160, output unit 180, and control unit 190 may respectively perform the same operations as interface unit 110, determining unit 120, image processing unit 140, graphic memory 160, output unit 180, and control unit 190 of FIG. 25.

For example, a still image SIMG may be output by output unit 180 after being written in graphic memory 160, as only first frame FRM1 of still image SIMG is image-processed by image processing unit 140. Also, moving image MIMG may be output by output unit 180 without having to access graphic memory 160 for writing or scanning, as all frames of moving image MIMG are image-processed by image processing unit 140.

Also, as described with reference to FIG. 4, determining unit 120 may include first comparison unit 122 and second comparison unit 124, in order to determine whether input image IIMG is a still image SIMG or moving image MIMG. The first comparison unit 122 may output first comparative value CVAL1 based on a comparison of first representative value RVAL1 and second representative value RVAL2.

In FIG. 26, first comparison unit 122 may produce the first and second representative values RVAL1 and RVAL2 from input image IIMG. The first representative value RVAL may be stored in first storage area 126. The first comparison unit 122 may receive second comparative value CVAL2 from the first storage area 126 to perform the comparing operation. The first comparison unit 122 may indicate first comparative value CVAL1 in a first start value C1_flag and a first end value C1_done. For example, first comparative value CVAL1 may change, or be set, to a high logical value H in first start value C1_flag and to a low logical value L in first end value C1_done.

The second comparison unit 124 may output second comparative value CVAL2 based on a comparison of a current frame and first image data IDTA1 in response to first comparative value CVAL1. The second comparison unit 124 may indicate the second comparative value CVAL2 in a second start value C2_flag and a second end value C2_done. For example, second comparative value CVAL2 may change, or be set, to a high logical value H in second start value C2_flag and a low logical value L in second end value C2_done.

Control unit 190 may generate first control signal XCON1 by internal clock CLK_in separate from external clock CLK_ex. The internal clock CLK_in may be, for example, an operation clock of the image driving device 2300. For example, internal clock CLK_in may be a clock adaptable in performing a display operation in a display device for displaying an output of image driving device 2300. In one implementation, internal clock CLK_in may be a clock having the same period as a vertical synchronization signal Vsync for determining a vertical location or a horizontal synchronization signal Hsync for determining a horizontal location of a frame (display data) displayed on the display device. The internal clock CLK_in may not be synchronized with the external clock CLK_ex in one embodiment.

The control unit 190 may receive the first start value C1_flag and first end value C1_done, or the second start value C2_flag and second end value C2_done, and generate the first control signal XCON1 corresponding thereto. For example, when second start value C2_flag is received, control unit 190 may generate the first control signal XCON1 so that first image data IDTA1 is stored in graphic memory 160. When the second end value C2_done is received, control unit 190 may generate the first control signal XCON1 so that a storage operation of graphic memory 160 is completed. For example, first control signal XCON1 applied to graphic memory 160 may be indicated in a write start value W_flag and a write end value W_done. Graphic memory 160 may perform a writing operation in response to the write start value W_flag and end the writing operation, in response to the write end value W_done.

Figure 27:
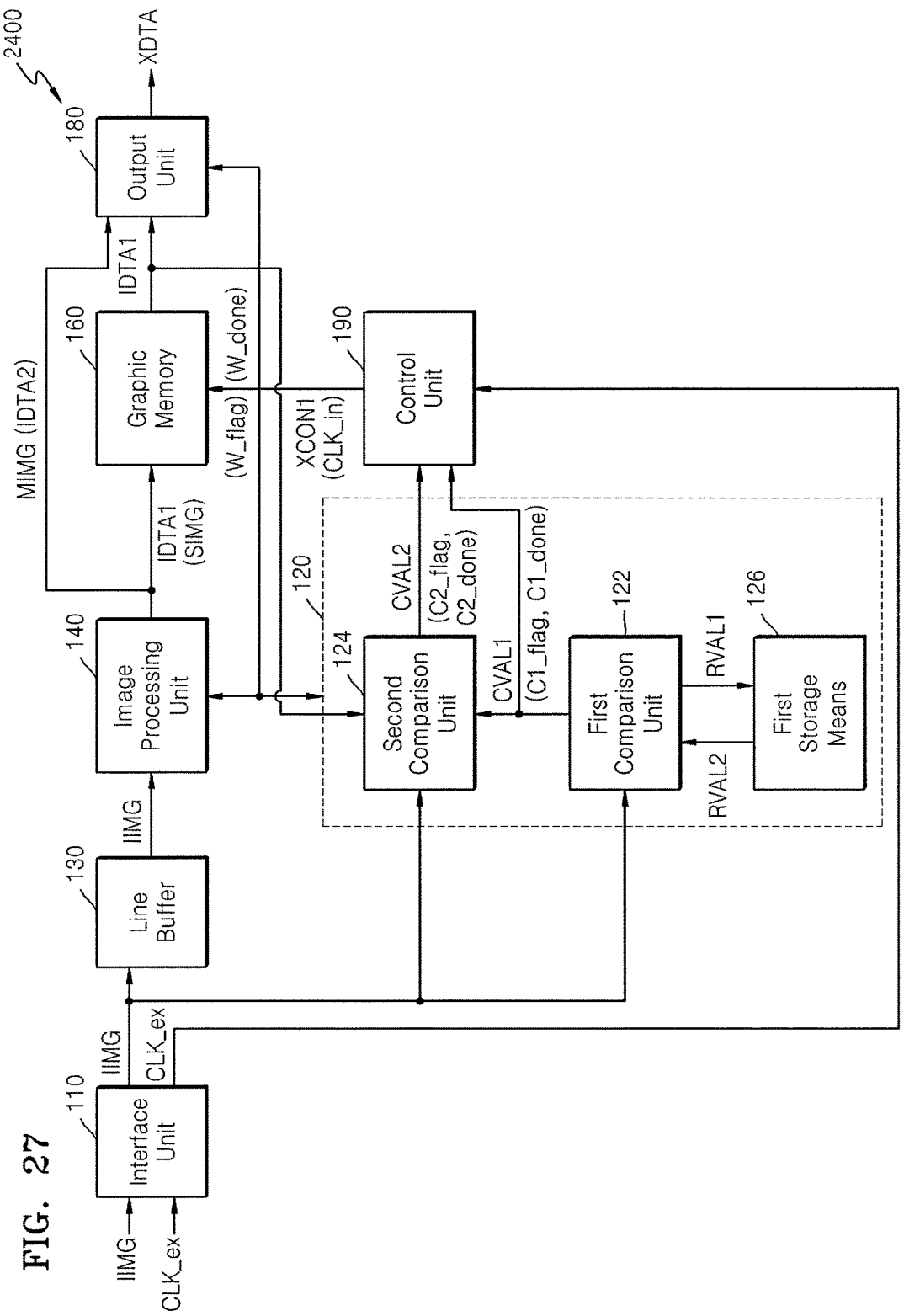
FIG. 27 illustrates another embodiment of an image driving device.

FIG. 27 illustrates another embodiment of an image driving device 2400 which includes interface unit 110, determining unit 120, image processing unit 140, graphic memory 160, output unit 180, and control unit 190. Moreover, the image driving device 2400 may include a line buffer 130.

Figure 28:
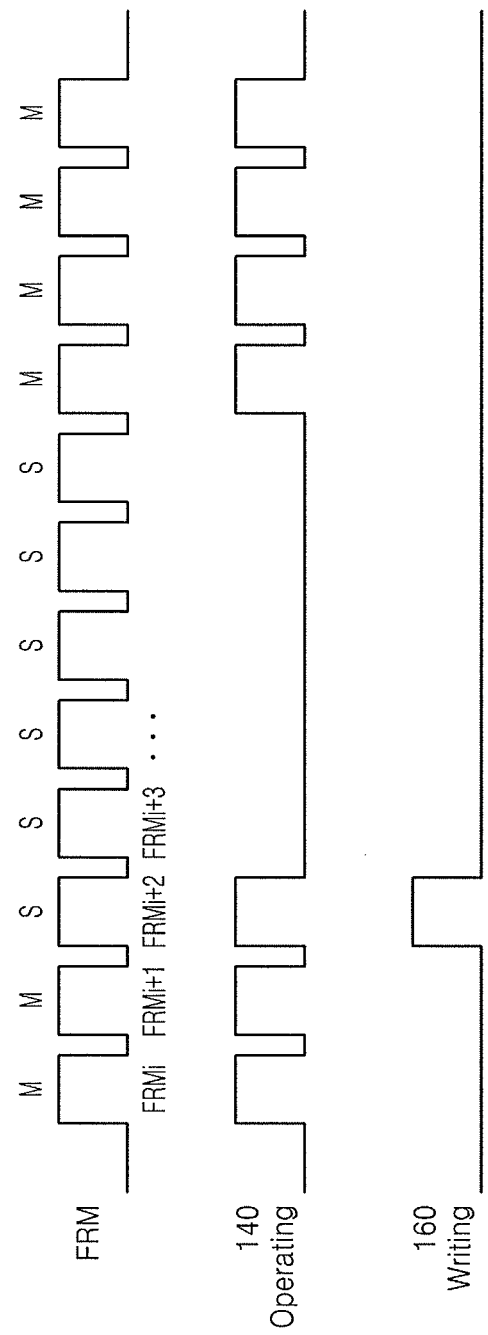
FIGS. 28 and 29 illustrate examples of operations of an image driving device.
Figure 29:
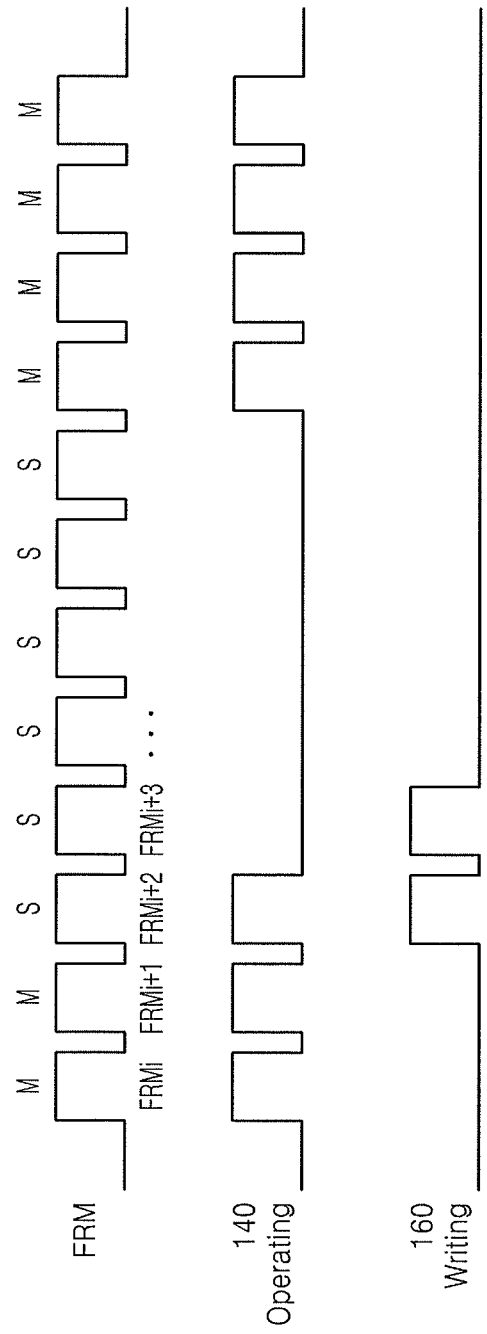

FIGS. 28 and 29 illustrate timing diagrams of operations of the image driving device 400. Referring to FIG. 28, some of consecutive frames FRMi, FRMi+1, . . . , may be in the following order: moving image MIMG, moving image MIMG, still image SIMG, and still image SIMG. In FIG. 28, a frame of a moving image MIMG corresponds to M, and a frame of a still image SIMG corresponds to S. The image processing unit 140 image-processes the ith frame FRMi and i+1th frame FRMi+1 for moving image MIMG. Also, image processing unit 140 image-processes the i+2th frame FRMi+2 for still image SIMG. However, in this embodiment, image processing unit 140 does not image-process a frame after the i+3th frame FRMi+3; that is, the second still image frame.

The ith frame FRMi and i+1th frame FRMi+1 of moving image MIMG are not stored in graphic memory 160. Only the i+2th frame FRMi+2 (that is, the first frame of the still image SIMG) may be stored in graphic memory 160.

Referring to FIG. 29, a writing operation may be performed on two frames of a still image SIMG. For example, the writing operation may be performed on two frames when image driving device 400 is to simultaneously process the two frames, when graphic memory 160 has a size corresponding to two frames (to assign resources if image driving device 400 uses a pipeline scheme to process an image), or when it is determined once again whether input image IIMG is a still image SIMG, to improve reliability. In FIG. 29, the writing operation is performed on two consecutive i+2 and i+3 frames FRMi+2 and FRMi+3 of still image SIMG. For example, the writing operation may be performed on two spaced frames or two or more frames in other embodiments.

Figure 30:
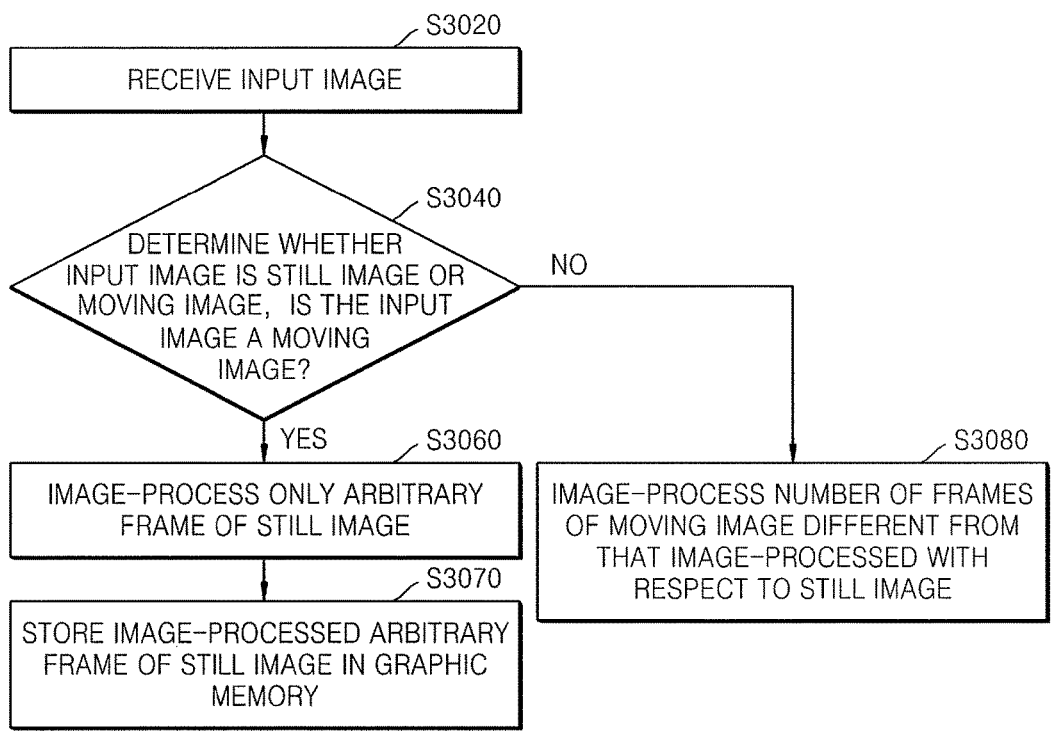
FIG. 30 illustrates an embodiment of an image driving method.

FIG. 30 illustrates an embodiment of an image driving method. Referring to FIGS. 1 and 30, the image driving method includes receiving an input image IIMG in operation S3020, determining whether the input image IIMG is a still image SIMG in operation S3040, image-processing only an arbitrary frame of still image SIMG in operation S3060 when input image IIMG is a still image SIMG (e.g., Yes, in operation S3040), and storing the image-processed arbitrary frame of still image SIMG in graphic memory 160 in operation S3070. However, when input image IIMG is a moving image MIMG (e.g., No, in operation S3040), a number of frames different from that processed for still image SIMG (e.g., all frames of moving image MIMG) may be image-processed in operation S3080.

Figure 31:
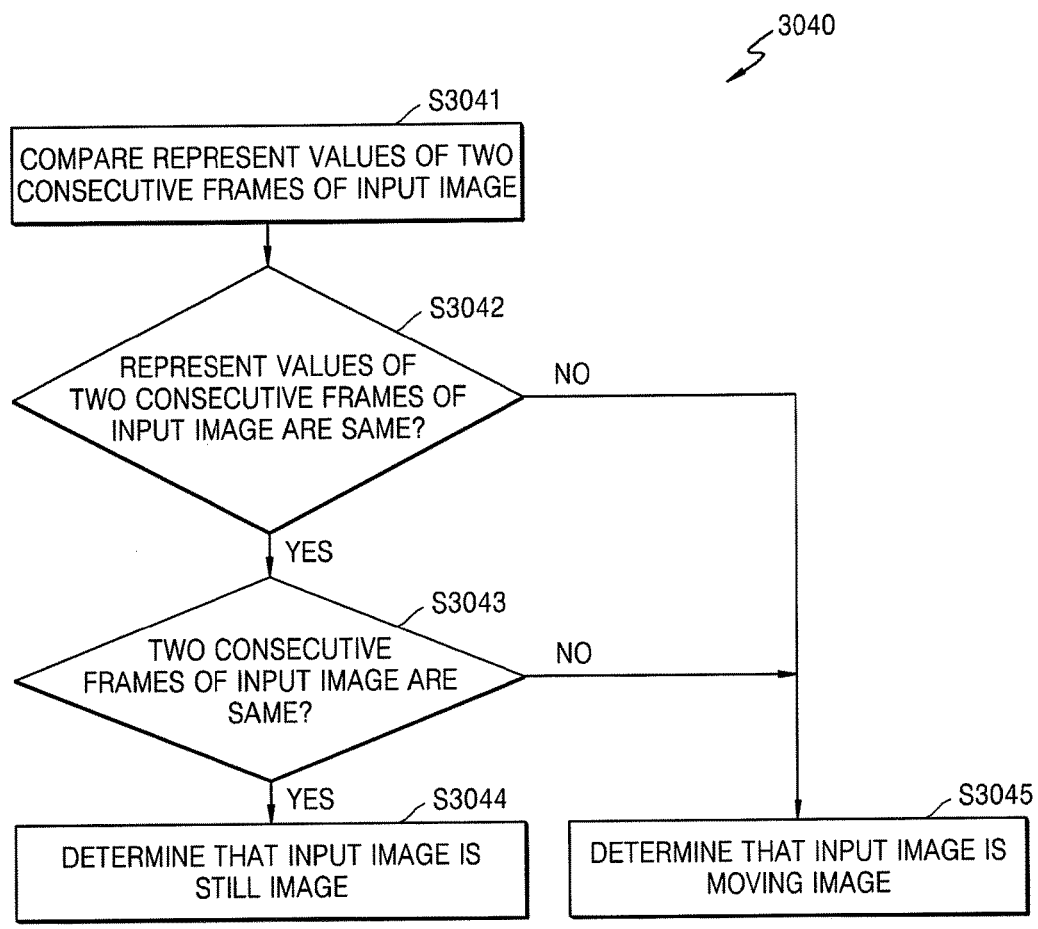
FIGS. 31-34 illustrate additional operations of the method of FIG. 30.

FIGS. 31 through 34 illustrate operations for determining whether an input image IIMG is a still image SIMG, in connection with the method in FIG. 30. Referring to FIGS. 4 and 31, operation S3040 includes comparing the first and second representative values RVAL1 and RVAL2 of respective ith and i−1th frames FRMi and FRMi−1 in operation S3041, and determining whether the first and second representative values RVAL1 and RVAL2 are the same in operation S3042.

When the first and second representative values RVAL1 and RVAL2 are the same (e.g., Yes, in operation S3042) and when the ith frame FRMi and i−1th frame FRMi−1 or the ith frame FRMi and first image data IDTA1 are the same (e.g., Yes, in operation S3043), it is determined that input image IIMG is a still image SIMG in operation S3044.

When the first and second representative values RVAL1 and RVAL2 are different (e.g., No, in operation S3042), or when the ith frame FRMi and i−1th frame FRMi−1 or the ith frame FRMi and first image data IDTA1 are different (e.g., No in operation S3043), it is determined that input image IIMG is a moving image MIMG in operation S3045.

Figure 32:
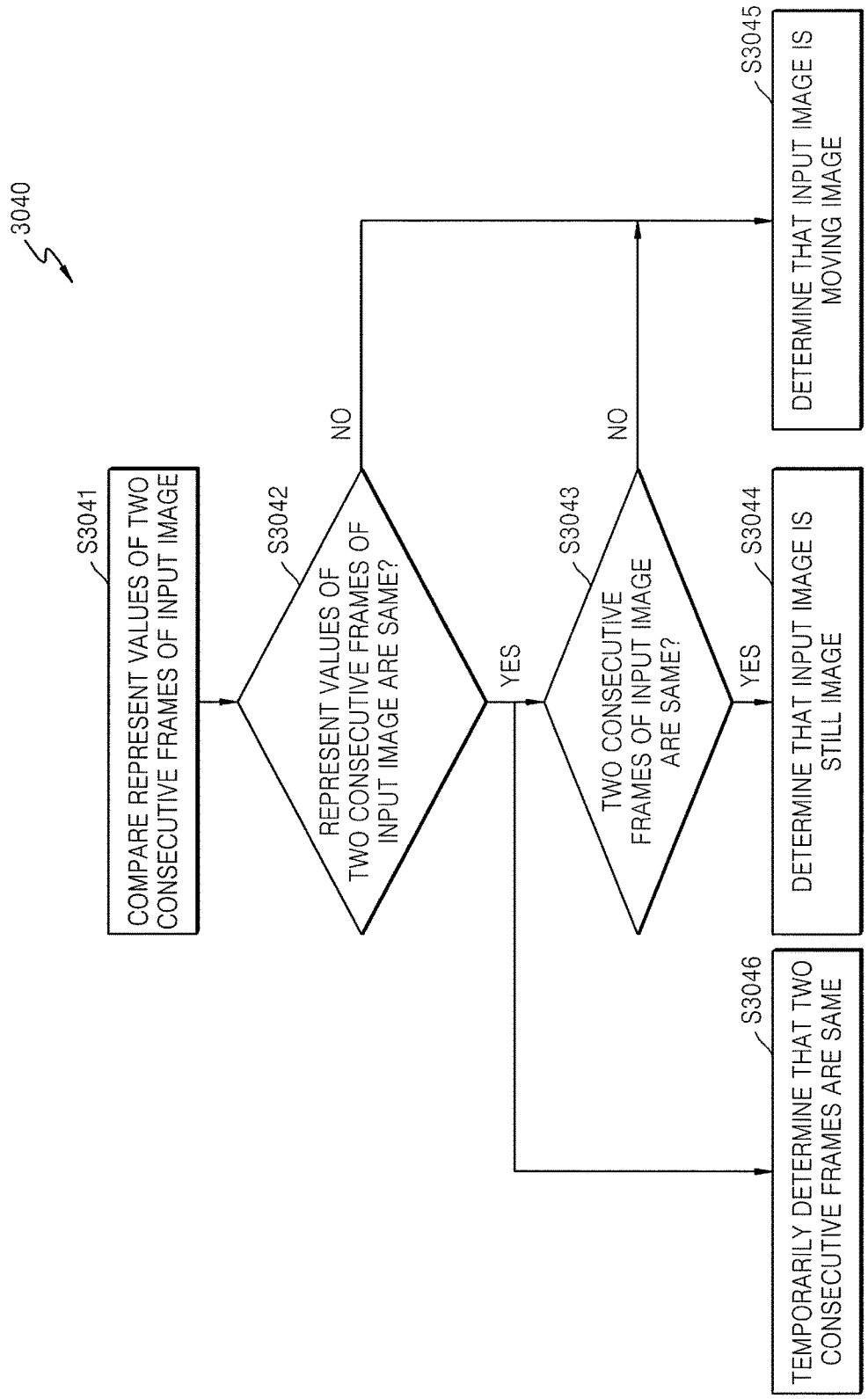

Alternatively, as shown in FIG. 32, operation S3040 may not determine whether the ith frame and i−1th frame FRMi and FRMi−1 or the ith frame FRMi and first image data IDTA1 are the same when the first and second representative values RVAL1 and RVAL2 are the same (e.g., Yes, in operation S3043). Instead, the method may include temporarily determining that the ith frame FRMi and i−1th frame FRMi−1 or the ith frame FRMi and first image data IDTA1 are the same, i.e., the ith frame FRMi is a frame of a still image SIMG, in operation S3046, as the determination result XRST of FIG. 12.

Figure 33:
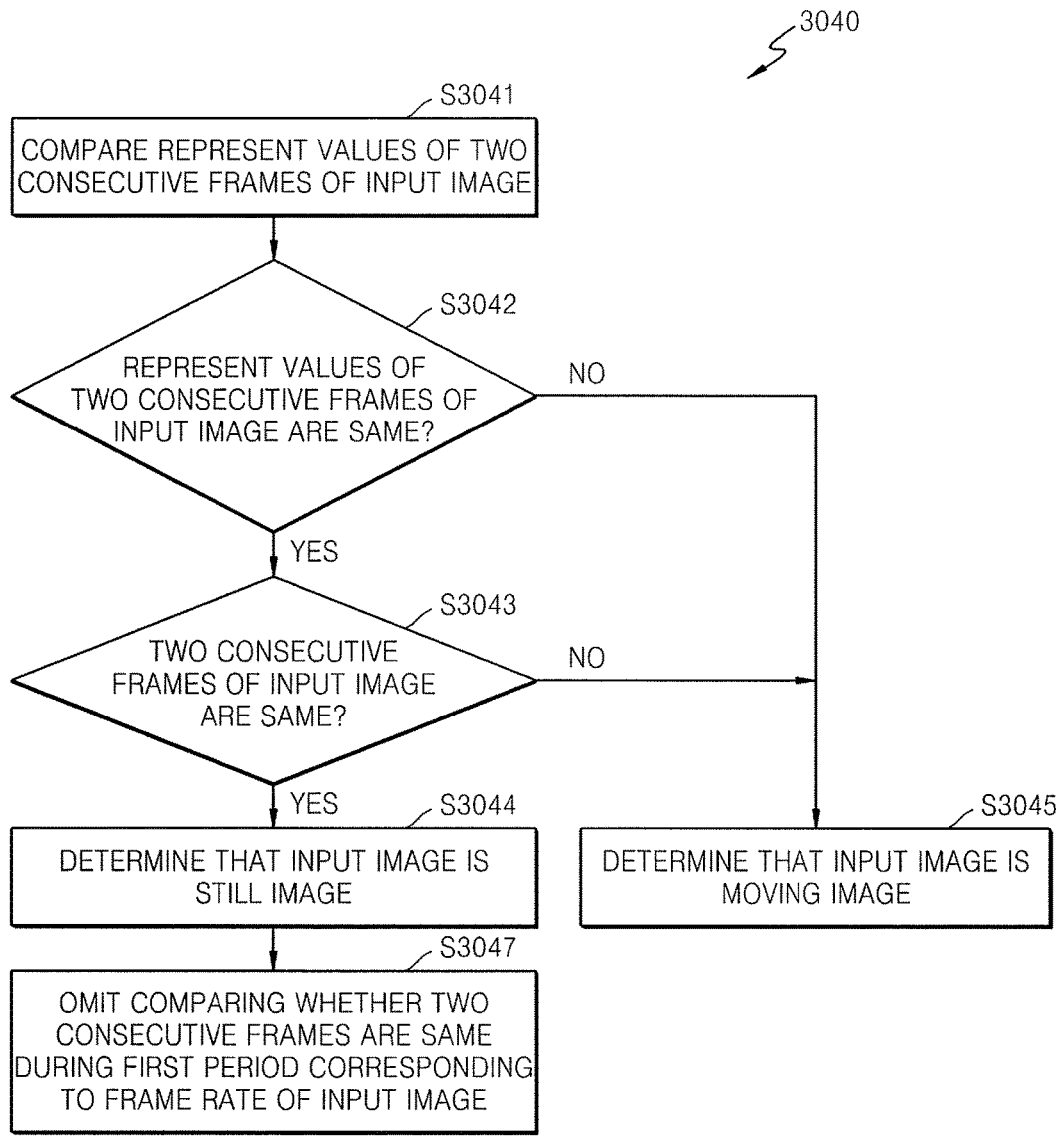

Alternatively, referring to FIGS. 4, 14, and 33, once it is determined that the ith frame FRMi is the frame of a still image SIMG in operation S3044, operation S3040 may include not comparing whether the ith frame FRMi and the i−1th frame FRMi−1 are the same during the first period PER1 in operation S3047, even if the first comparative value CVAL1 indicates that the first and second representative values RVAL1 and RVAL2 are the same.

Figure 34:
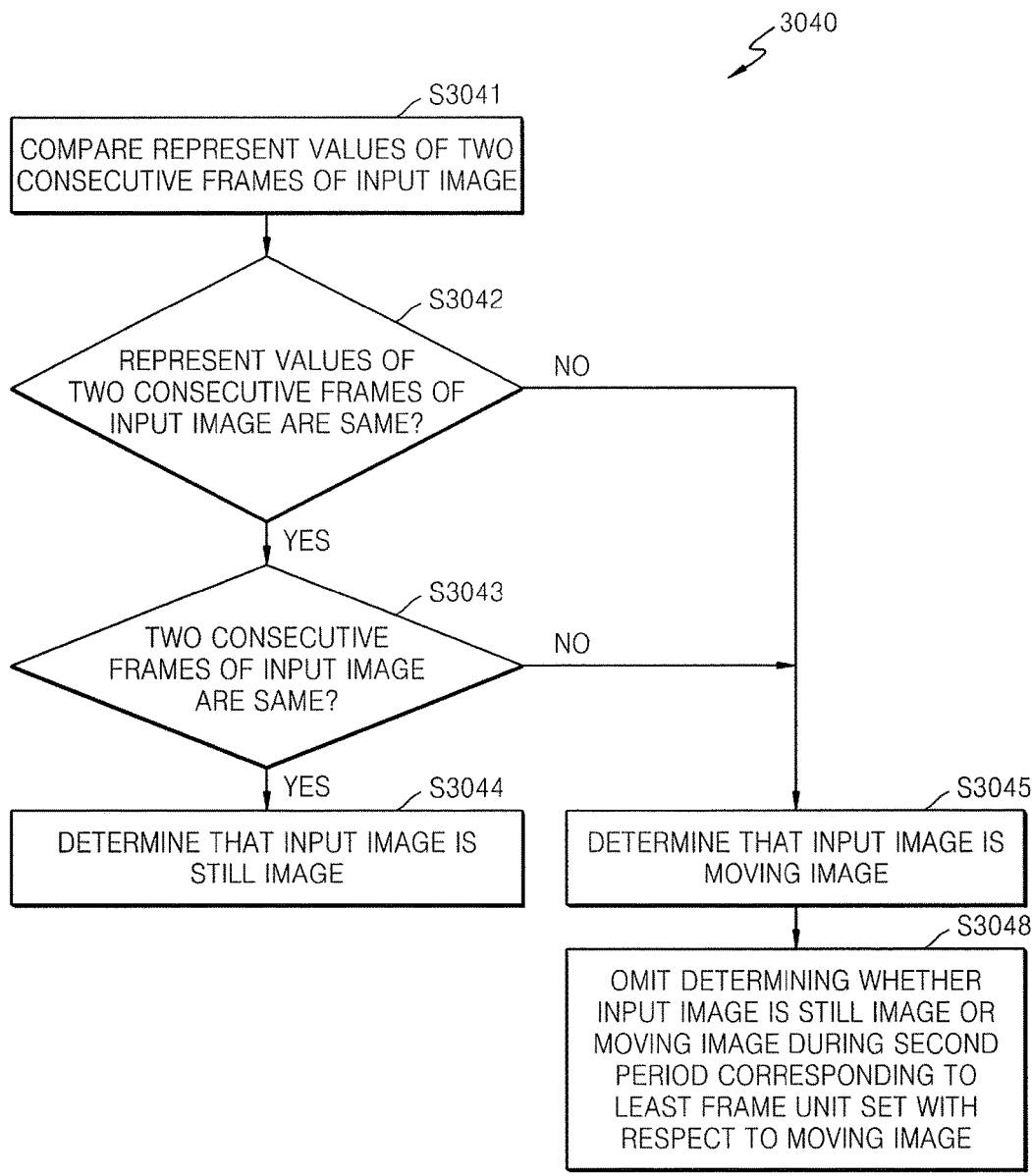

Alternatively, referring to FIGS. 4, 15, and 34, once it is determined that the ith frame FRMi is the frame of moving image MIMG in operation S3045, operation S3040 may include not determining whether the input image IIMG is the moving image MIMG or the still image SIMG in operation S3048 during the second period PER2 corresponding to the least frame unit LFU set with respect to the moving image MIMG.

Figure 35:
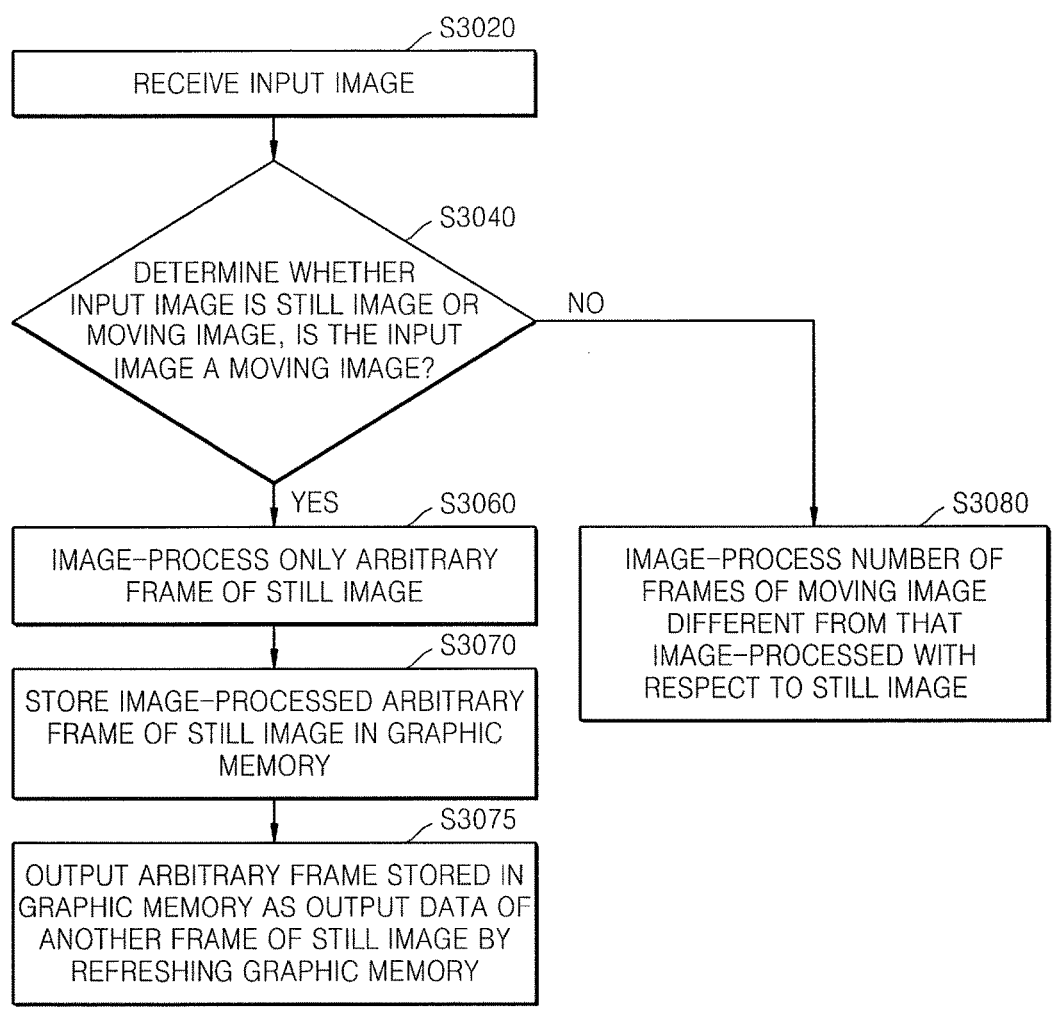
FIGS. 35-36 illustrate another embodiment of an image driving method.
Figure 36:
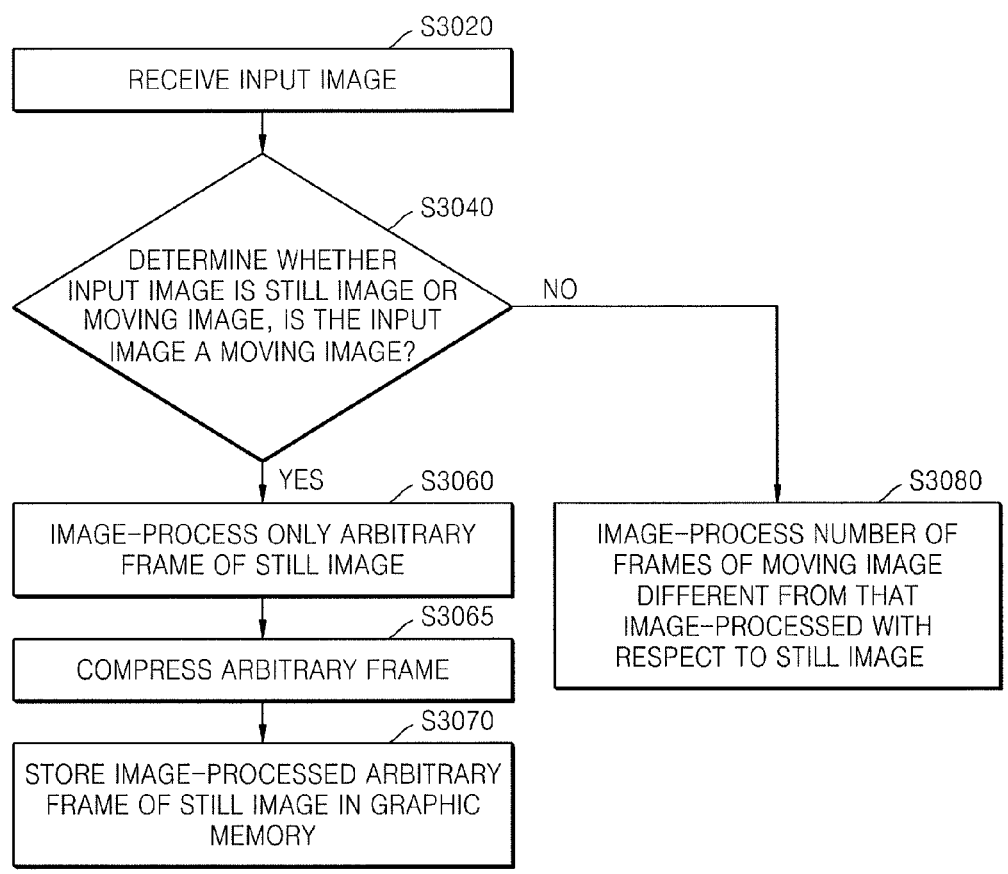

FIGS. 35 and 36 illustrate another embodiment of an image driving method which includes receiving input image IIMG in operation S3020, determining whether the input image IIMG is a still image SIMG in operation S3040, image-processing an arbitrary frame of still image SIMG in operation S3060 when input image IIMG is a still image SIMG (e.g., Yes, in operation S3040), and storing the image-processed arbitrary frame of still image SIMG in graphic memory 160 in operation S3070.

The method may further include image-processing a number of frames of moving image MIMG different from that image-processed with respect to the still image SIMG (e.g., all frames of moving image MIMG in operation S3080) when input image IIMG is a moving image MIMG (e.g., No, in operation S3040). The image driving method of FIG. 35 may further include outputting an arbitrary frame stored in graphic memory 160 as output data XDTA of another frame of still image SIMG by refreshing graphic memory 160 in operation S3075.

Like the image driving method of FIG. 30, the image driving method of FIG. 36 may include receiving input image IIMG in operation S3020, determining whether the input image IIMG is a still image SIMG in operation S3040, image-processing an arbitrary frame of the still image SIMG in operation S3060 when the input image IIMG is a still image SIMG (e.g., Yes, in operation S3040), and storing the image-processed arbitrary frame of the still image SIMG in graphic memory 160 in operation S3070.

The method may further include image-processing a number of frames of the moving image MIMG different from that image-processed with respect to the still image SIMG (e.g., all frames of moving image MIMG in operation S3080) when the input image IIMG is a moving image MIMG (e.g., No, in operation S3040).

The image driving method of FIG. 36 may further include, before storing the arbitrary frame of the still image SIMG in graphic memory 160, compressing the arbitrary frame in operation S3065. Accordingly, as described above with reference to FIG. 21, the first image data IDTA1 that is compressed may be stored in graphic memory 160. Operation S3065 may be performed by the encoder END of FIG. 21.

Figure 37:
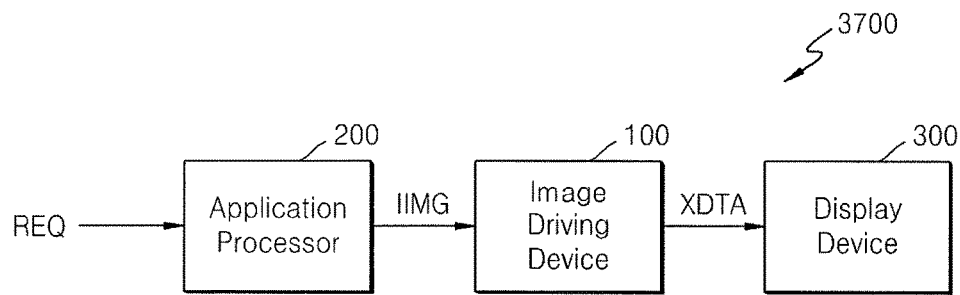
FIGS. 37-41 illustrate an embodiment of an electronic device.
Figure 38:
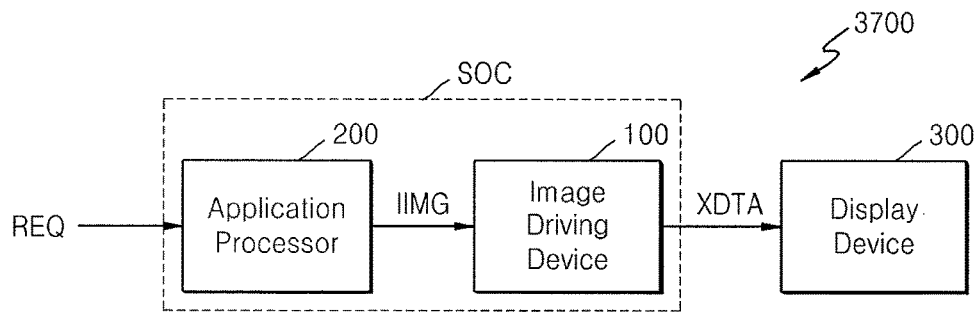

FIGS. 37 through 41 illustrate an embodiment of an electronic device 3700. Referring to FIGS. 37 and 38, electronic device 3700 includes an application processor 200, an image driving device, and display device 300. The application processor 200 may be realized in a system on-chip (SoC) on which a central processing unit (CPU) and a system memory (for example, a dynamic random access memory (DRAM)) are mounted as processors for controlling operations of functional blocks of electronic device 3700, such as the image driving device. The image processing device may be one according to any of the aforementioned embodiments. Image driving device 100 is illustrated as an example.

Alternatively, as shown in FIG. 38, image driving device 100 may also be realized in a SoC along with application processor 200. Alternatively, the application processor 200 may be realized in SoC together with various functional blocks including image driving device 100.

In the SoC including application processor 200, or application processor 200 and image driving device 100, application processor 200 may transmit input image IIMG to image driving device 100 from a system memory connected via an interconnector, according to a request REQ of a user. The input image IIMG may be transmitted to image driving device 100 by being synchronized with external clock CLK_ex of FIG. 1. The image driving device 100 may operate in a clock separate from the external clock CLK_ex.

Image driving device 100 may perform different processes optimized or customized for power consumption, by determining whether input image IIMG is a still image SIMG or moving image MIMG. Accordingly, power consumption of electronic device 3700 including image driving device 100 may be reduced. Also, an EMI phenomenon may be prevented based on a reduction of power consumption of image driving device 100. As a result, the accuracy of operations of not only the image driving device 100, but also other functional blocks of electronic device 3700, may be improved. Accordingly, reliability of the electronic device 3700 may be increased.

The output data XDTA output from the image driving device 100 is transmitted to the display device 300. Upon receiving output data XDTA, display device 300 displays the output data XDTA on a display panel. The display device 300 may display output data XDTA of image driving device 500 by being synchronized with horizontal synchronization signal Hsync and vertical synchronization signal Vsync as previously described.

Figure 39:
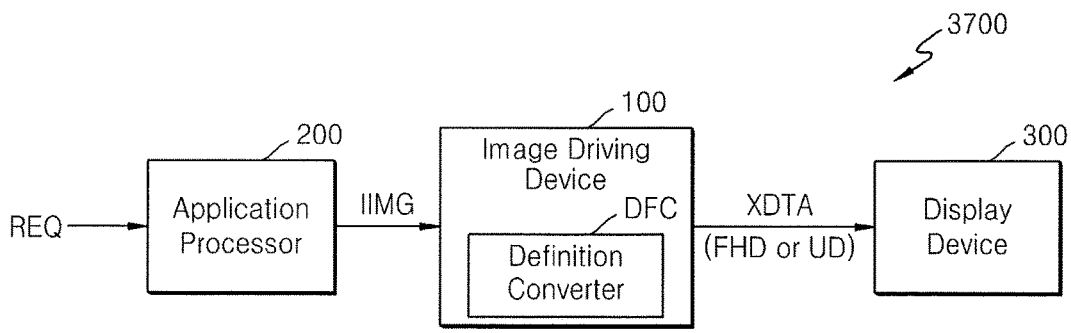

Like electronic device 3700 in FIG. 37 or 38, electronic device 3700 of FIG. 39 may include application processor 200, an image driving device, and display device 300 to display an image in response to the request REQ of the user. The image driving device may be any of the aforementioned embodiments. Image driving device 100 is illustrated as an example.

Moreover, electronic device 3700 of FIG. 39 may display an image (e.g., output data XDTA) in full high definition (HD) or ultra definition (UD). Full HD may have a pixel definition, for example, of 1920×1080. Ultra definition UD may have a pixel definition, for example, of 3840×2160 or 7680×4320. The image driving device 100 may further include a definition converter DFC for performing resizing, so as to output the image input IIMG input, for example, in a definition lower than 720×1280 in full HD or UD. For example, definition converter DFC may generate a new pixel value by calculating an average value of motion vectors between adjacent pixels of each frame of the input image IIMG, thereby converting the definition of the input image IIMG.

Figure 40:
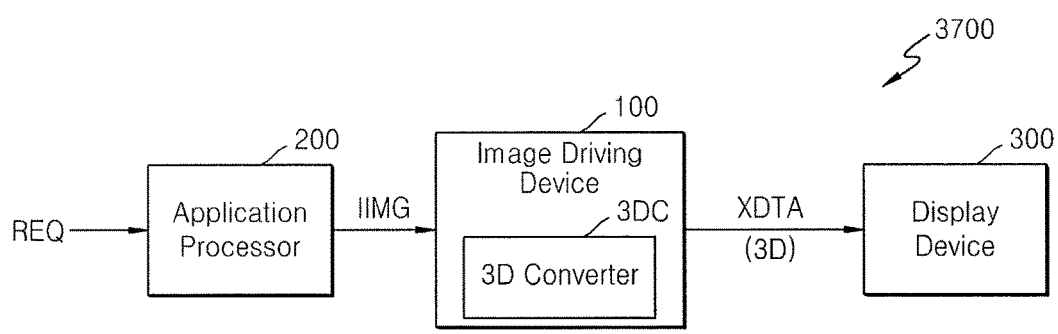

Like electronic devices 3700 of FIGS. 37 through 39, electronic device 3700 of FIG. 40 may include application processor 200, an image driving device, and display device 300 to display an image (e.g., output data XDTA) in response to the request REQ of the user. The image driving device may be any of the aforementioned embodiments. Image driving device 100 is illustrated as an example.

Moreover, the electronic device 3700 may display a 3-dimensional (3D) image according to the request REQ of the user. The image driving device 100 may further include, for example, a 3D converter 3DC for outputting the input image IIMG in 2D in output data XDTA in 3D. For example, 3D converter 3DC may generate a depth map with respect to pixel data of each frame of input image IIMG, and generate output data XDTA in 3D by performing 3D rendering on the depth map.

Figure 41:
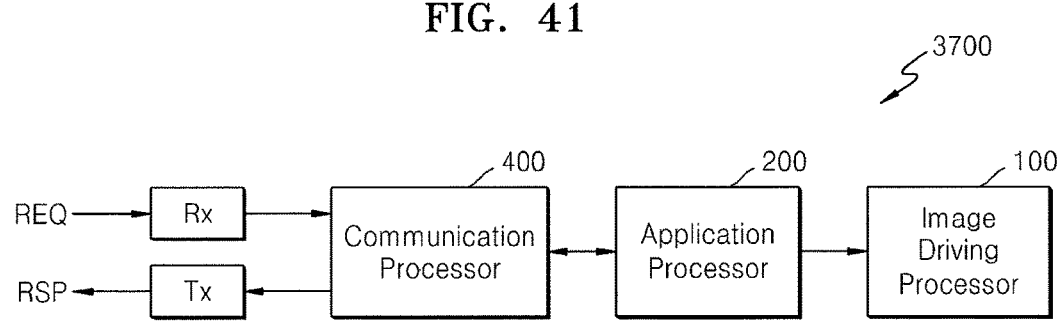

Referring to FIG. 41, electronic device 3700 may be, for example, a mobile device. In addition to application processor 200, image driving device 100, and display device 300, electronic device 3700 of FIG. 41 may include a communication processor 400, receiver Rx, and transmitter Tx. The application processor 200 may be controlled to display output data XDTA in response to request REQ of the user, while communication processor 400 communicates with an external device via a communication protocol. For example, communication processor 400 may process request REQ received through receiver Rx and transmit the request REQ to application processor 200. Also, communication processor 400 may receive response RSP processed by application processor 200 for request REQ and may transmit response RSP to the user or another network or electronic device designated by the user through transmitter Tx.

According to one or more of the aforementioned embodiments, an image driving device, an electronic device including an image driving device, and an image driving method is provided in which the image driving device classifies and processes a still image and a moving image in a manner that is optimized or customized to the still image and the moving image.

According to one or more of the aforementioned embodiments, an image driving device, electronic device including an image driving device, and image driving method is provided which classifies an input image as a still or moving image in a manner which does not perform image processing or which uses an arbitrary number of frames while processing a still image, or which does not access a memory while processing the moving image. These embodiments may therefore reduce power consumption for the same processes without performing image classification.

According to one or more of the aforementioned embodiments, an image driving device, electronic device including an image driving device, and image driving method is provided in which current consumption for driving an image is reduced as the image driving device classifies and processes a moving image and a still image. As a result, an EMI phenomenon generated by driving the image may be prevented, and thus malfunction of the image driving device of the electronic device may be reduced.

According to one or more of the aforementioned embodiments, an image driving device, electronic device including an image driving device, and image driving method is provided in which the image driving device autonomously classifies and processes a moving image and still image. Accordingly, a processor for controlling the image driving device may have a low load in performing a control according to the moving image and still image. A time required to drive an image may therefore be reduced.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An image driving device, comprising:
an analyzer to output a value indicative of whether an input image is a moving image or a still image, the analyzer to be synchronized with an internal clock different from an external clock;
an image processor to receive the input image and perform image-processing for compensating image quality of the input image, the image processor to receive the value and to perform the image-processing on different numbers of frames based on whether the value indicates the input image is a still image or a moving image, wherein the image processor is to perform the image-processing for compensating image quality on at least one frame but less than all frames of the input image to generate a first image data if the value indicates the input image is a still image, and the image processor is to perform the image-processing for compensating image quality on all frames of the input image to generate a second image data, if the value indicates the input image is a moving image; and
a memory to store the first image data received from the image processor if the value indicates the input image is a still image.

2. The device as claimed in claim 1, wherein the analyzer includes:
a first comparator to compare representative values of consecutive frames of the input image and to output a first comparative value based on the comparison performed by the first comparator; and
a second comparator to compare whether the consecutive frames of the input image are equal when the first comparative value indicates that the representative values of the consecutive frames are equal, and to output a second comparative value based on the comparison performed by the second comparator.

3. The device as claimed in claim 2, wherein:
each of the representative values of the consecutive frames indicates at least one of a check sum, a data sum, a data histogram, or random address data of a corresponding one of the consecutive frames, or each of a plurality of lines of the consecutive frames.

4. The device as claimed in claim 2, further comprising:
a first storage area to store a representative value of a previously input frame from among the consecutive frames of the input image.

5. The device as claimed in claim 2, wherein:
when the consecutive frames of the input image are determined to be equal, the second comparator is to withhold comparing whether the consecutive frames of the input image are equal during a first period corresponding to a frame rate of the input image.

6. The device as claimed in claim 1, further comprising:
a second storage to store a determination result of a previously input frame from among the consecutive frames of the input image.

7. The device as claimed in claim 1, wherein the image processor is to image-process only a first frame of the input image and is to transmit the image-processed first frame to the memory, when the analyzer determines that the input image is a still image.

8. The device as claimed in claim 1, wherein the image processor is to image-process at least one arbitrary frame of the input image only and is to transmit the at least one image-processed arbitrary frame to the memory, when the analyzer determines that the input image is a still image.

9. The device as claimed in claim 1, wherein the image processor is to output the second image data to an external display device instead of the memory, if the value indicates the input image is a moving image.

10. The device as claimed in claim 1, wherein the analyzer does not determine whether the input image is a moving image or a still image during a second period corresponding to a least frame unit set with respect to the moving image, when the analyzer determines that the input image is a moving image.

11. The device as claimed in claim 1, further comprising:
an output to output one of the first image data stored in the memory or second image data based on a result of the determination by the analyzer, wherein the second image data is data not stored in the memory but directly output from the image processor as output data of the input image.

12. The device as claimed in claim 1, wherein:
the memory is to perform a refresh operation corresponding to a frame rate of output data of the image driving device and is to repeatedly output the first image data, when the analyzer determines that the input image is a still image.

13. The device as claimed in claim 1, wherein:
the memory has a size less than each frame of the input image, and
the image driving device includes:
an encoder to compress the first image data; and
a decoder to decode the first image data compressed and stored in the memory as output data of the input image.

14. The device of claim 1, wherein the external clock and the input data are input based on control of an application processor of a mobile terminal in which the image driving device is included.

15. An image driving device, comprising:
an interface to receive an input image from outside the image driving device;
an analyzer to output a value indicative of whether an input image is a moving image or a still image;
an image processor to receive the input image and perform image-processing for compensating image quality of the input image, the image processor to receive the value and to perform the image-processing on a different number of frames based on whether the value indicates that the input image is a moving image or still image, wherein the image processor is to generate first image-processed frames by performing the image-processing for compensating image quality on at least one frame but less than all frames of the input image if the value indicates the input image is a still image, and the image processor is to generate second image processed frames by performing the image-processing for compensating image quality on all frames of the input image if the value indicates the input image is a moving image; and
a memory to store the first image-processed frames received from the image processor if the input image is a still image, wherein power consumption to output the input image as output data differs based on whether the input image is a moving image or still image.

16. An apparatus, comprising:
an analyzer to output a value indicative of whether input image data corresponds to a moving image or a still image; and
an image processor to receive the input image and perform processing for compensating image quality of the input image, the image processor to receive the value and to perform the processing for compensating image quality on a first number of frames of the input image data when the value indicates that the input image data corresponds to a still image and to perform the processing for compensating image quality on a second number of frames when the value indicates that the input image data corresponds to a moving image, wherein the first number of frames is different from the second number of frames, wherein the image processor is to output the processed first number of frames to a graphic memory if the value indicates that the input image data corresponds to a still image, and wherein the image processor outputs the processed second number of frames without storing the second number of frames in the graphic memory if the value indicates that the input image data corresponds to a moving image.

17. The apparatus as claimed in claim 16, wherein the first number of frames is fewer than all frames of the input image data.

18. The apparatus as claimed in claim 16, wherein the analyzer includes:
a first comparator to compare representative values of consecutive frames of the input image data and to output a first value based on the comparison; and
a second comparator to compare whether the consecutive frames of the input image data are equal when the first value indicates that the representative values of the consecutive frames are equal, the second comparator to output a second value based on the comparison performed by the second comparator.

19. The apparatus as claimed in claim 18, wherein each of the representative values of the consecutive frames indicates at least one of a check sum, data sum, data histogram, or random address data of a corresponding one of the consecutive frames.

20. The apparatus as claimed in claim 18, wherein:
when the consecutive frames of the input image data are equal, the second comparator is to withhold comparing whether the consecutive frames of the input image are equal during a first period corresponding to a frame rate of the input image data.

* * * * *